United States Patent
Itou

(10) Patent No.: US 10,248,310 B2
(45) Date of Patent: Apr. 2, 2019

(54) APPARATUS AND METHOD FOR CONTROLLING INFORMATION INPUT

(71) Applicant: FUJITSU LIMITED, Kawasaki-shi, Kanagawa (JP)

(72) Inventor: Kazuhiro Itou, Yokohama (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/163,753

(22) Filed: May 25, 2016

(65) Prior Publication Data

US 2016/0349986 A1    Dec. 1, 2016

(30) Foreign Application Priority Data

May 26, 2015    (JP) .................. 2015-106458

(51) Int. Cl.
| | | |
|---|---|---|
| *G06F 3/0488* | (2013.01) | |
| *G06F 3/0484* | (2013.01) | |
| *G06F 3/01* | (2006.01) | |
| *G06F 3/023* | (2006.01) | |

(52) U.S. Cl.
CPC .......... *G06F 3/04883* (2013.01); *G06F 3/018* (2013.01); *G06F 3/0236* (2013.01); *G06F 3/04842* (2013.01)

(58) Field of Classification Search
CPC ............... G06F 3/0416; G06F 3/04842; G06F 3/04883; G06F 3/018; G06F 3/0236
USPC .................. 178/18.01–19.07; 345/173–178; 715/700–866
See application file for complete search history.

(56) References Cited

U.S. PATENT DOCUMENTS

| | | | | |
|---|---|---|---|---|
| 9,207,776 B2* | 12/2015 | Jiang | ...................... | G06F 3/0236 |
| 2006/0033723 A1* | 2/2006 | Maw | ...................... | G06F 3/0202 |
| | | | | 345/173 |
| 2009/0289902 A1* | 11/2009 | Carlvik | ............... | G06F 3/04883 |
| | | | | 345/173 |

(Continued)

FOREIGN PATENT DOCUMENTS

| | | |
|---|---|---|
| EP | 2477106 | 7/2012 |
| JP | 11224161 A | 8/1999 |

(Continued)

OTHER PUBLICATIONS

Office Action dated Nov. 20, 2018, issued in counterpart Japanese Application No. 2015-106458, with English translation (7 pages).

*Primary Examiner* — Michael Pervan
(74) *Attorney, Agent, or Firm* — Westerman, Hattori, Daniels & Adrian, LLP

(57) ABSTRACT

An information processing apparatus includes a detection unit that detects a direction of an operation of a first stage in which a contact position on an operation surface moves from a peripheral region of the operation surface to a center region thereof, and a direction of an operation of a second stage in which the contact position moves from the center region to the peripheral region that continues from the operation of the first stage; and a processing unit that specifies a target item from among an input item group based on the direction of the operation of the first stage, and specifies an input candidate corresponding to the direction of the operation of the second stage from among the specified target item.

15 Claims, 19 Drawing Sheets

(56) References Cited

U.S. PATENT DOCUMENTS

| | | | |
|---|---|---|---|
| 2011/0071818 A1* | 3/2011 | Jiang | G06F 3/0236 |
| | | | 704/8 |
| 2012/0182325 A1 | 7/2012 | Hayashi | |
| 2012/0206382 A1 | 8/2012 | Kusano | |
| 2014/0157126 A1 | 6/2014 | Kusano | |
| 2014/0192244 A1 | 7/2014 | Ishihara et al. | |
| 2014/0340557 A1 | 11/2014 | Ishihara et al. | |
| 2015/0181110 A1 | 6/2015 | Ishihara et al. | |
| 2015/0229836 A1 | 8/2015 | Ishihara et al. | |
| 2015/0304548 A1 | 10/2015 | Ishihara et al. | |
| 2016/0202903 A1* | 7/2016 | Gutowitz | G06F 3/04886 |
| | | | 715/771 |

FOREIGN PATENT DOCUMENTS

| | | |
|---|---|---|
| JP | 2012-146160 | 8/2012 |
| JP | 2012-168939 | 9/2012 |
| JP | 2013-171295 | 9/2013 |
| JP | 2013-200876 | 10/2013 |

* cited by examiner

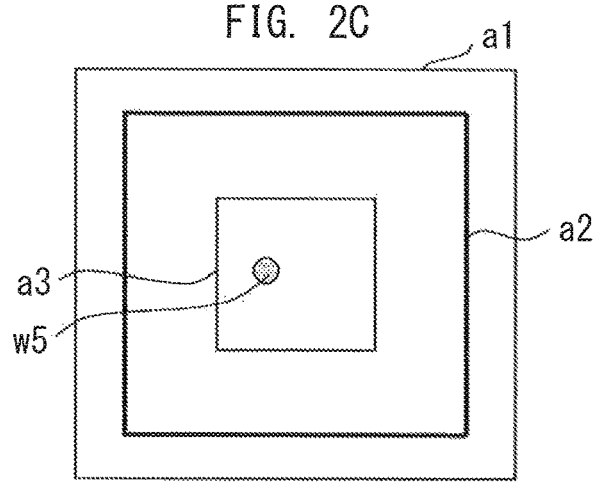
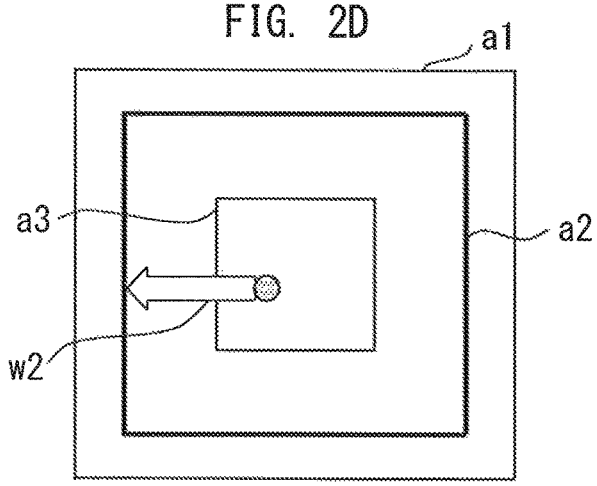
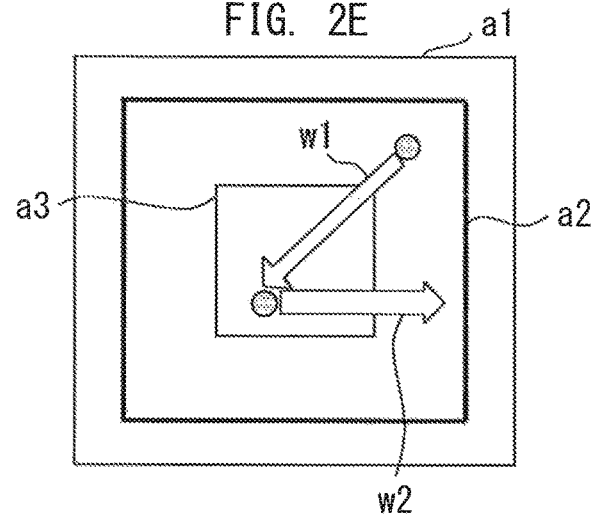

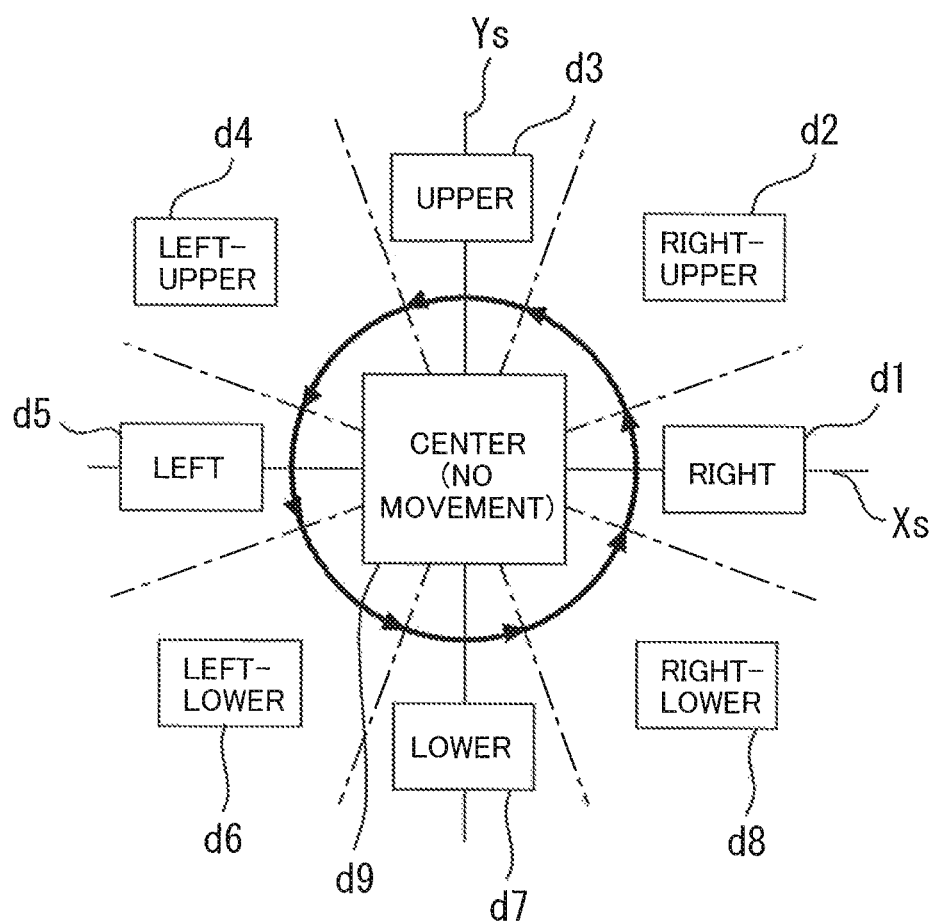

P2: DETERMINED AS INPUT FOR "na" ROW CHARACTER IS DEFINED IN NEXT MOVEMENT

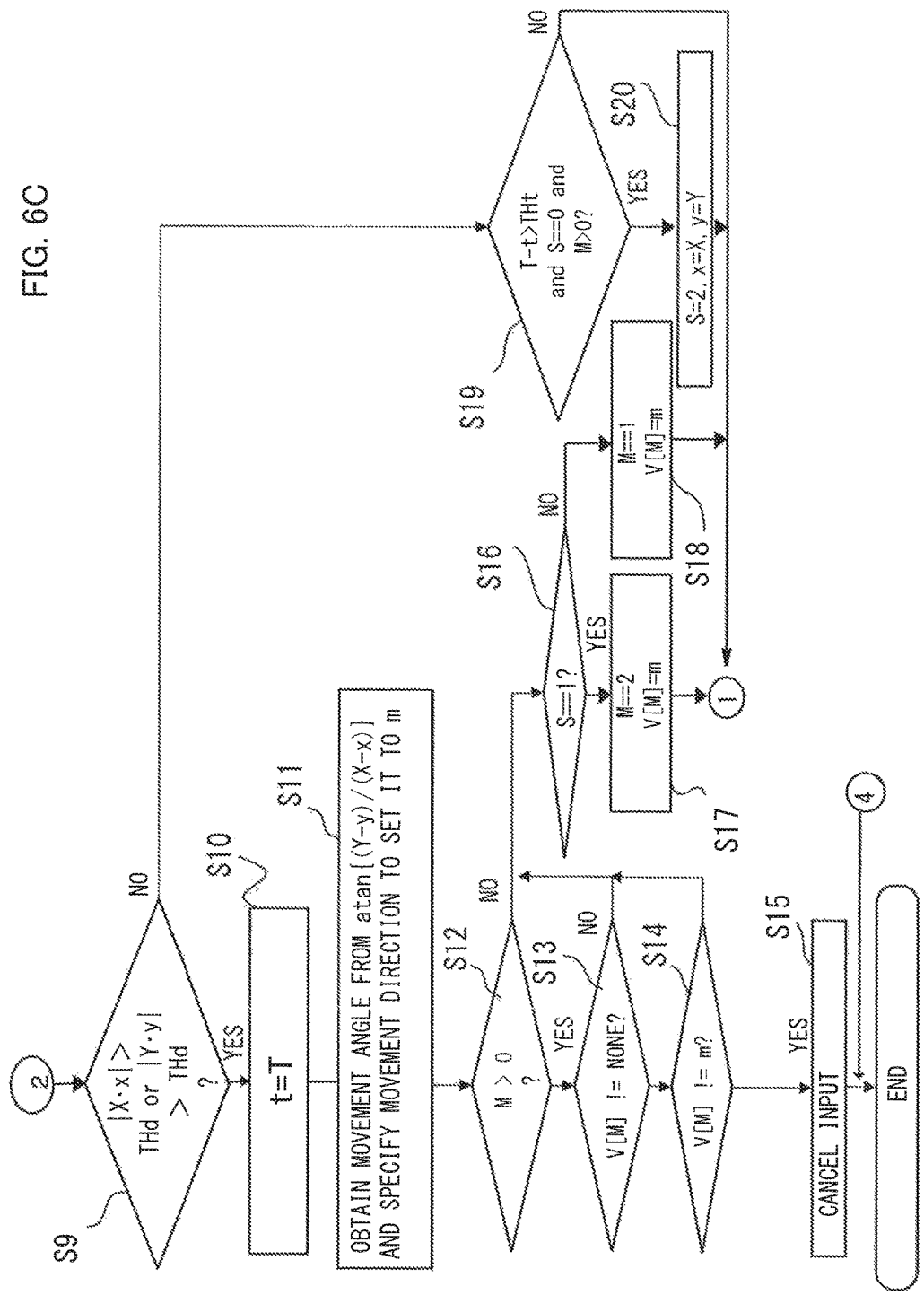

FIG. 7A

| MAIN CLASSIFICATION | SUB-CLASSIFICATION | CHARACTER/CONTROL CODE (INPUT MODE: KANA/KANJI) | CHARACTER/CONTROL CODE (INPUT MODE: ALPHANUMERIC CHARACTERS) |
|---|---|---|---|
| RIGHT-LOWER | CENTER | あ | , |
| RIGHT-LOWER | LEFT | い | / |
| RIGHT-LOWER | UPPER | う | @ |
| RIGHT-LOWER | RIGHT | え | : |
| RIGHT-LOWER | LOWER | お | 1 |
| CENTER-LOWER | CENTER | か | a |
| CENTER-LOWER | LEFT | き | b |
| CENTER-LOWER | UPPER | く | c |
| CENTER-LOWER | RIGHT | け | # |
| CENTER-LOWER | LOWER | こ | 2 |
| ... | ... | ... | ... |

FIG. 7B

| | | | |
|---|---|---|---|
| ... | CENTER | ... | ... |
| CENTER | LEFT | た | J |
| CENTER | UPPER | に | K |
| CENTER | RIGHT | ぬ | L |
| CENTER | LOWER | ね | & |
| ... | ... | の | 5 |
| RIGHT-LOWER | NONE | VOICED SOUND SYMBOL CHARACTER CONVERSION | ... |
| LOWER | NONE | UPPER/LOWER-CASE CHARACTER CONVERSION | UPPER/LOWER-CASE CHARACTER CONVERSION |
| ... | ... | ... | ... |
| LEFT | NONE | DELETION CONTROL | DELETION CONTROL |
| ... | ... | ... | ... |
| RIGHT-UPPER | NONE | SEMI-VOICED SOUND SYMBOL CHARACTER CONVERSION | ... |
| RIGHT | NONE | INPUT MODE SWITCHING (TO ALPHANUMERIC CHARACTERS) | INPUT MODE SWITCHING (TO KANA/KANJI) |

APPARATUS AND METHOD FOR CONTROLLING INFORMATION INPUT

CROSS-REFERENCE TO RELATED APPLICATION

This application is based upon and claims the benefit of priority of the prior Japanese Application No. 2015-106458 filed on May 26, 2015, the entire contents of which are incorporated herein by reference.

FIELD

The present invention relates to an information processing apparatus, an input control program and an input control method.

BACKGROUND

In recent years, information processing apparatuses equipped with an input device such as a touch panel are in widespread use. A touch panel is an input device in which, for example, a device that detects coordinates of a position that is contacted by a user operation is superimposed on and combined with a display device such as an LCD (Liquid Crystal Display). A PC (Personal Computer), a portable telephone, a smartphone, a laptop PC, a tablet PC, a PDA (Personal Data Assistant), a game machine and a navigation device can be mentioned as examples of information processing apparatuses that are equipped with a touch panel.

In the above described information processing apparatus, for example, objects relating to character input and the like are displayed on the display device. The operator (hereafter, also referred to as "user") of the information processing apparatus, for example, may input a predetermined character by performing a touch operation by bringing an operation finger or the like into contact with a display region of objects relating to character input or the like. The following input forms are known as interfaces for performing character input by a touch operation.

For example, with regard to an operation to input kana (Japanese syllabary) characters on a display device, let us assume that objects are displayed in which a column "a" of the respective rows "a, ka, sa, ta, na, ha, ma, ya, ra, wa" in the Japanese 50-sound chart are arrayed like a numeric keypad. Japanese kana characters "a", "ka", "sa", "ta", "na", "ha", "ma", "ya", "ra" and "wa" are written as below.

"あ", "か", "さ", "た", "な", "は", "ま", "や", "ら", "わ"

The information processing apparatus, for example, detects the repetition of a touch operation in a display region of the respective objects (toggle input), and switches a displayed object. For example, in accordance with the repetition of a touch operation, the information processing apparatus switches the displayed kana characters of each row in the manner of column "a"→column "i"→column "u"→"e"→column "o". Japanese characters "a", "i", "u", "e" and "o" are written as below.

"あ", "い", "う", "え", "お"

A user may input a desired character by switching the display characters that are displayed by a toggle input.

Further, for example, around the area in which the characters "a, ka, sa, ta, na, ha, ma, ya, ra, wa" included in the column "a" are arranged like a numeric keypad, the other four columns (column "i", column "u", column "e", and column "o") may be arranged in a cross shape or a fan shape. The information processing apparatus detects a flick operation that moves the contact position of a finger so as to flick the finger, for example, in the direction of a region in which a target character is disposed from a region in which keys of the column "a" of each row are displayed. According to the information processing apparatus, a character disposed in a region corresponding to the movement direction of the flick operation is selected as an input character. A user may input a desired character by performing a flick operation in the direction of the region in which the target character is disposed from the display region of the respective rows.

For further information, see Japanese Laid-Open Patent Publication No. 2013-171295, Japanese Laid-Open Patent Publication No. 2012-146160, Japanese Laid-Open Patent Publication No. 2013-200876, and Japanese Laid-Open Patent Publication No. 2012-168939

In input forms that use a toggle method or a flick method that are described above, a display region of a character row becoming an initial operation object is displayed on a touch panel screen. For example, the row "a, ka, sa, ta, na, ha, ma, ya, ra, wa" which is used as the initial operation object is displayed on a touch panel screen for user's touch. Therefore, for example, in a case where the display device has a small size and a display region of a touch panel is narrow, there is a possibility that pressing errors occur by erroneous contact of an adjacent operation object.

SUMMARY

One of aspects is an information processing apparatus. The information processing apparatus includes a detection unit configured to detect a direction of an operation of a first stage in which a contact position on an operation surface moves from a peripheral region of the operation surface to a center region thereof, and a direction of an operation of a second stage in which the contact position moves from the center region to the peripheral region that continues from the operation of the first stage; and a processing unit configured to specify a target item from among an input item group based on the direction of the operation of the first stage, and to specify an input candidate corresponding to the direction of the operation of the second stage from among the specified target item.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 2C is a diagram illustrating an example of distinguishing a touch operation in a case of using a discrimination region;

FIG. 2D is a diagram illustrating an example of distinguishing a touch operation in a case of using a discrimination region;

FIG. 2E is a diagram illustrating an example of distinguishing a touch operation in a case of using a discrimination region;

FIG. 2F is a diagram illustrating segments with respect to angle ranges of movement directions;

FIG. 6C is a flowchart illustrating character input processing of the present embodiment;

FIG. 7A is a diagram illustrating an example of an input character table for distinguishing input characters that are associated with touch operations; and FIG. 7B is a diagram illustrating an example of an input character table for distinguishing input characters that are associated with touch operations.

DETAILED DESCRIPTION OF EMBODIMENT

An Hereinafter, an embodiment of an information processing apparatus will be described with reference to the accompanying drawings. The configurations of the embodiment are merely an example, and the present invention is not limited to the configurations of the embodiment.

Hereunder, an information processing apparatus will be described based on Figures.

Embodiment

Figure 1:
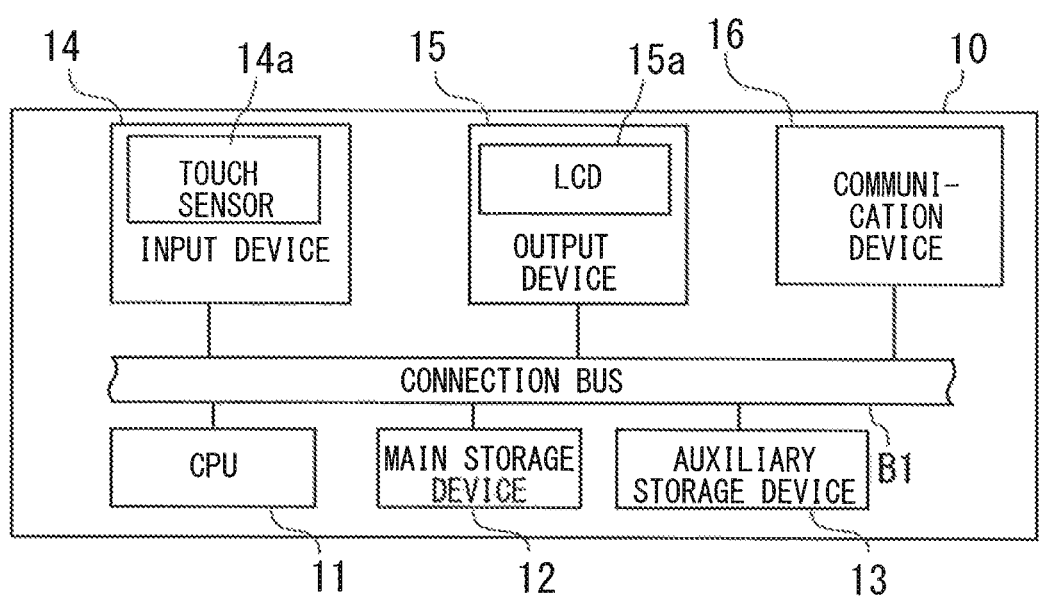
FIG. 1 is a diagram illustrating a hardware architecture example of an information processing apparatus of the present embodiment.

FIG. 1 illustrates an example of the hardware architecture of an information processing apparatus of the present embodiment. An information processing apparatus 10 of the present embodiment is equipped with an input device that detects coordinates of a contact position at which a device such as a touch panel or a touch pad is touched by an operation of an operator (hereinafter, also referred to as "user"). A touch panel is an input device in which, for example, a device that detects coordinates of a position that is touched by a user operation is superimposed on and combined with a display device such as an LCD (Liquid Crystal Display). A touch pad is an input device that detects coordinates of a position that is touched by a user operation in a state in which the touch pad is not superimposed on a display device and is separate therefrom.

Examples of the information processing apparatus 10 include information processing apparatuses such as a PC (Personal Computer), a portable telephone, a smartphone, a laptop PC, a tablet PC, a PDA (Personal Data Assistance), a game machine and a navigation device. Note that, as long as the information processing apparatus 10 is an electronic instrument equipped with an input device that detects coordinates of a position that is touched, the information processing apparatus 10 may also be a wearable electronic instrument that may be worn by the user, such as a wristwatch or a wristband.

The information processing apparatus 10 illustrated in FIG. 1 includes a display device such as an LCD 15a in an output device 15. The information processing apparatus 10 also includes a device that detects coordinates of a contact position on a device surface, such as a touch sensor 14a in an input device 14. In this case, a "device surface" is one example of an operation surface. The touch sensor 14a may be a touch panel that is combined with a display device such as the LCD 15a, or may be a touch pad in a separated state, and functions as a pointing device. In the following description, as one example the touch sensor 14a is described as a touch panel that is combined with the display device of the LCD 15a.

The touch sensor 14a captures a change in a physical quantity of, for example, an electrostatic capacity, a voltage, a pressure, a light or a vibration as a detection signal, to thereby detect a contact of an operation finger or the like on the device surface. Further, the touch sensor 14a detects the withdrawal of the operation finger or the like that contacted the device surface, based on a change in the detection signal that indicates a contact state with respect to the aforementioned physical quantity. Contact onto and withdrawal from the device surface that are detected by the touch sensor 14a are detected, for example, as coordinates that indicate a position at which a detection signal changed on the device surface.

The coordinates that are detected by the touch sensor 14a may be expressed, for example, as (X, Y) two-dimensional coordinates which take the upper left corner part of the device as the origin, and take the horizontal direction of the display device as the X-axis and the vertical direction as the Y-axis.

In the following description, the device surface of the touch panel is also referred to as "touch panel region", and a region in which contact of an operation finger or the like is detected is also referred to as "input region".

The information processing apparatus 10 detects the contact position of a touch operation by an operation finger or the like. The contact position occurs in the input region. The information processing apparatus 10 also detects a withdrawal position from the input region of the operation finger or the like. Further, the information processing apparatus 10 detects a movement of an operation finger or the like that is in a contact state within the input region, based on a change in the position of the coordinates indicating the contact position. A movement of an operation finger or the like that is in a contact state within the input region is detected based on a positional change in a contact position that is sampled at a fixed period such as, 10 ms, 16.6 ms or 20 ms. A history of sampled contact positions serves as time series data. The time series data of coordinates that indicate sampled contact positions can be expressed, for example, as a path on the device.

The information processing apparatus 10, for example, detects a movement direction within the input region based on the path of an operation finger or the like that is in a state of contact. The movement direction may be represented, for example, by a relative angle between the X-axis and a path that links contact positions in time series data obtained by sampling. For example, the movement direction may be defined as a relative angle in a left rotational direction when taking the normal direction of the X-axis as "0°". Here, it is assumed that contact positions that are adjacent in the sampled time series data are denoted by P1 (X1, Y1) and P2 (X2, Y2), respectively. A relative angle (θ) between the Y-axis and a path that links the coordinate P1 and the coordinate P2 can be determined, for example, as (θ)=a tan ((Y2−Y1)/(X2−X1)) by using an inverse trigonometric function "a tan".

Note that, the information processing apparatus 10 may determine a movement amount within the input region based on a path that accompanies movement of the operation finger or the like that is in a state of contact with the input region. Further, a movement speed can be determined based on a temporal change in the movement amount that accompanies movement of the operation finger or the like that is in a state of contact. The information processing apparatus 10 can determine the movement speed based on the movement amount per unit time.

The information processing apparatus 10 can detect a touch operation (also referred to as "tap operation") with respect to a contact position in a case where, for example, the coordinates of a contact position that are detected in an input region fall within a predetermined range and the contact finger or the like is then withdrawn after contact.

Further, in a case where, for example, an operation finger or the like moves within the input region in a state of contact therewith and the movement speed increases and the operation finger or the like is then withdrawn, the information processing apparatus 10 may detect a touch operation (also referred to as "flick operation") that moves the operation finger or the like that is in a state of contact with the input region so as to flick the operation finger or the like. Further, the information processing apparatus 10 may detect a touch operation in which an operation finger or the like moves within the touch panel region in a state of contact and the movement speed decreases and stops (the operation finger or the like stays for a certain time period at the contact position after the movement), or a touch operation in which an operation finger or the like withdraws after moving (also referred to as "swipe operation" or "slide operation"). Hereinafter, in the present description a flick operation, a swipe operation and a slide operation are referred to collectively as "flick operation". By detecting a flick operation, the information processing apparatus 10 may specify a movement direction, a movement amount, and a region (region including a path) that is passed through by such movement which accompany the flick operation.

(Touch Panel Region)

In the information processing apparatus 10 of the present embodiment, a discrimination region for discriminating the type of a touch operation is provided within an input region that detects the contact of an operation finger or the like within the touch panel region that is the device surface. The touch panel region is separated by the discrimination region into a region that is inside the discrimination region and a region that is outside the discrimination region. The information processing apparatus 10 of the present embodiment distinguishes a type of a touch operation based on coordinates within the respective regions that are separated into the region inside the discrimination region and the region outside the discrimination region.

The information processing apparatus 10 of the present embodiment, for example, distinguishes between a flick operation that is accompanied by a movement from inside the discrimination region to outside the discrimination region, and a flick operation that is accompanied by a movement from outside the discrimination region to inside the discrimination region. Further, for example, the information processing apparatus 10 distinguishes a tap operation performed in the discrimination region. In the case of it is determined that a touch operation is a flick operation, the information processing apparatus 10 may specify movement direction, movement amount and region(s) passed through by the movement of the flick operation based on the movement path. The information processing apparatus 10 of the present embodiment, for example, distinguishes an input item of information that is associated with relevant touch operation based on a combination pattern in which the type of touch operation that is distinguished and the movement direction are combined.

Figure 2A:
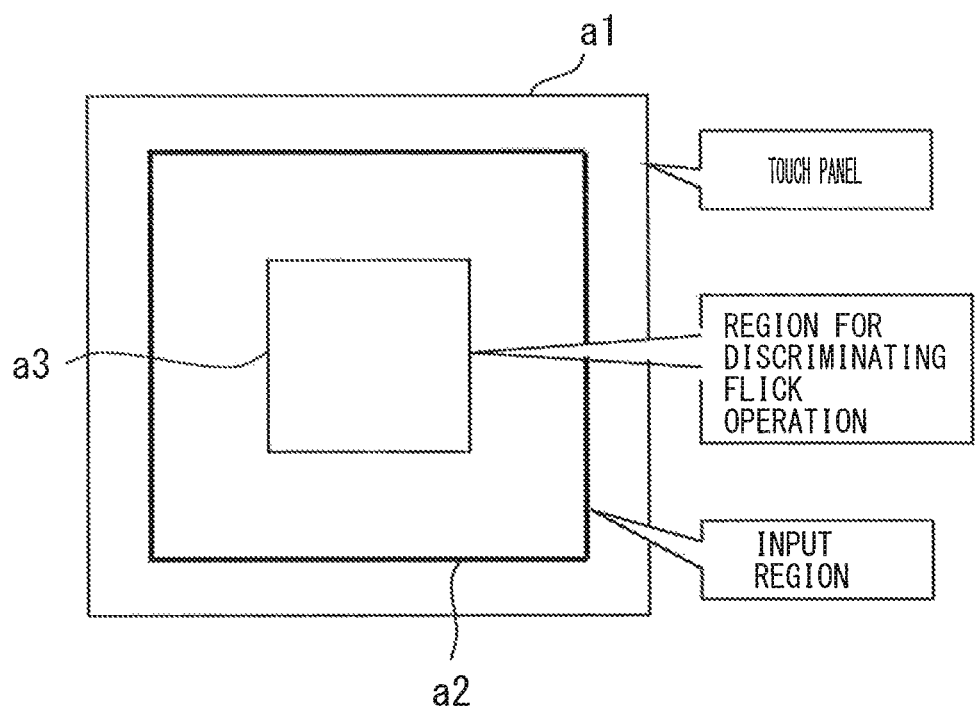
FIG. 2A is a diagram illustrating a touch panel region.

FIG. 2A illustrates an explanatory diagram of the touch panel region of the information processing apparatus 10 of the present embodiment. A rectangular touch panel region a1 illustrated in FIG. 2A may be, for example, superimposed on a display region of a display device such as the LCD 15a. The touch panel region a1, an input region a2 and a discrimination region a3 are not limited to rectangular regions. The touch panel region a1, the input region a2 and the discrimination region a3 are set according to the shape and intended use of the electronic instrument that is equipped with the touch panel, as well as the size and the like of the touch panel. The respective shapes of the touch panel region a1, the input region a2 and the discrimination region a3 may also be, for example, elliptical, or polygonal such as hexagonal, a star shape, etc. It is sufficient that the respective shapes enable the detection of a position of contact of an operation finger or the like that occurs in the input region a2 and the discrimination region a3, and also enable distinguishing of the type of touch operation and the movement direction.

As illustrated in FIG. 2A, the input region a2 and the discrimination region a3 are included in the touch panel region a1. The input region a2 and the discrimination region a3 in the touch panel region are used to perform an input operation with respect to an object of the touch operation. The coordinates of the input region a2 are separated (classified) into coordinates that are in the discrimination region a3 and coordinates that are out of the discrimination region a3 by the discrimination region a3 that exists within the input region a2. Based on the coordinates of inside the discrimination region a3 and the coordinates of outside the discrimination region a3, the information processing apparatus 10, for example, distinguishes an input item of information that is associated with a combination pattern of the type of a touch operation that occurs within the input region a2 and a movement direction thereof.

Note that, the input region a2 illustrated in FIG. 2A is an example of a concentric rectangular region that is set so as to share a common center position with the touch panel region a1. However, the input region a2 within the touch panel region a1 may be arranged so as to deviate in a fixed direction from the center position of the touch panel region a1. It is sufficient that the discrimination region a3 is included within the input region a2. For example, it is assumed that the touch panel region a1 is split in half into a region relating to character input and a region in which inputted characters or the like are displayed. The region relating to character input of the touch panel region a1 that is split in into two regions can be exemplified as the input region a2 that is provided so as to deviate in a fixed direction. Further, input directions or a boundary line of the input region may be displayed so as to be visually observable in the region relating to character input of the display region of the display device on which the touch panel region is superimposed, or input character candidates or the like in accordance with the relevant state may be displayed.

The discrimination region a3 is a region for distinguishing a touch operation that occurs within the input region a2 and which is a touch operation that moves from inside the discrimination region a3 to outside the discrimination region a3. Similarly, the discrimination region a3 is a region for distinguishing a touch operation that moves from outside the discrimination region a3 to inside the discrimination region a3. Further, the discrimination region a3 is a region for distinguishing a touch operation in which an operation finger or the like that is brought into contact with a position within the discrimination region a3 is withdrawn therefrom without moving.

The information processing apparatus 10 may also distinguish a touch operation that moves inside the discrimination region a3, and a touch operation that moves through the input region a2 on the outside of the discrimination region a3. In a case where, for example, a touch operation that is distinguished using the discrimination region a3 is accompanied by a movement, the information processing apparatus 10 specifies a movement direction and the like that accompanies the movement.

It is sufficient for the size of the discrimination region a3 to be a size such that a position of contact of an operation finger or the like that occurs inside the discrimination region a3 may be detected and the type of touch operation and the movement direction can be distinguished.

Note that, it is sufficient that a relative position of the discrimination region a3 with respect to the input region a2 is a position for which it is possible to distinguish a flick operation and a movement direction from inside the discrimination region a3 to outside the discrimination region a3, as well as a flick operation and a movement direction from outside the discrimination region a3 to inside the discrimination region a3. The size of the discrimination region a3 and a relative setting position of the discrimination region a3 with respect to the input region a2 may be set, for example, by the following setting procedures.

First, the discrimination region a3 is provisionally set in the input region a2 inside the touch panel region a1. Next, respective flick operations are performed with respect to the respective regions of the discrimination region a3 and the input region a2 that are provisionally set. The position and size of the discrimination region a3 within the input region a2 may be determined based on the detection rate or the like of each operation. In addition, an input operation may be performed using the discrimination region a3 that is set by the above described setting procedures, and the size of the discrimination region a3 may be determined according to the ease of use for the user. The information processing apparatus 10 may improve the usability of a touch operation using the discrimination region a3.

The discrimination region a3 illustrated in FIG. 2A represents one example of the discrimination region a3 that is set concentrically so that the center positions of the discrimination region a3 and the input region a2 are common.

Because a user that performs a touch operation may estimate the center position of the input region a2 by visually checking the area of the input region a2, it is desirable to provide the discrimination region a3 in a region at a center portion that includes the center position of the input region a2. As a result of the center position being estimated by the user that performs a touch operation, an effect is anticipated such that performance of a flick operation from an outer edge of the input region a2 towards the center position, or from the center position towards the outer edge of the input region a2 is facilitated for the user. An effect is also anticipated such that performance of a tap operation with respect to the center position of the input region a2 is facilitated for the user that performs a touch operation.

In the following description, the information processing apparatus 10 of the present embodiment is described taking the touch panel region a1, the input region a2 and the discrimination region a3 illustrated in FIG. 2A as examples for the description.

(Touch Operation)

Figure 2B:
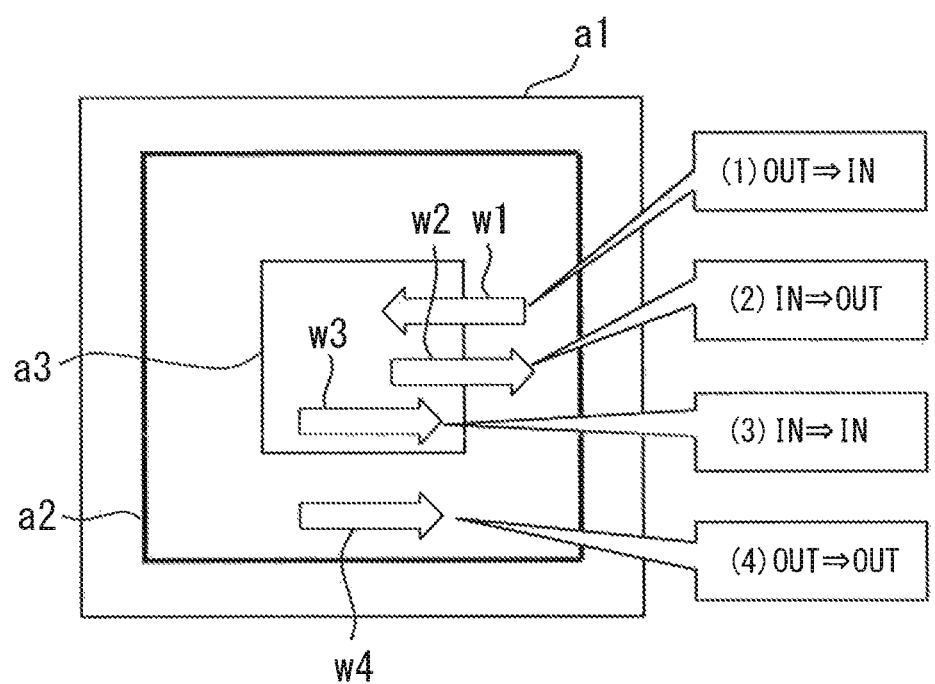
FIG. 2B is a diagram illustrating an example of distinguishing flick operations in a case of using a discrimination region.

FIG. 2B illustrates an example of distinguishing flick operations in the case of using the input region a2 and the discrimination region a3. As illustrated in FIG. 2B, by using the discrimination region a3, the information processing apparatus 10 may distinguish, for example, four kinds of flick operations w1 to w4 that occur in the input region a2.

The flick operation w1 is, for example, a flick operation from a position in the input region a2 that is outside the discrimination region a3 towards the inside of the discrimination region a3. The flick operation w2 is, for example, a flick operation from inside the discrimination region a3 towards a position in the input region a2 that is outside the discrimination region a3. The flick operation w3 is a flick operation that moves inside the discrimination region a3. The flick operation w4 is a flick operation that moves inside the input region a2 on the outside of the discrimination region a3.

In the case of the flick operation w1, a starting position of a path that accompanies the flick operation is detected at a position in the input region a2 that is outside the discrimination region a3. An ending position of the path is detected inside the discrimination region a3. In the case of the flick operation w2, a starting position of a path that accompanies the flick operation is detected inside the discrimination region a3. An ending position of the path is detected at a position in the input region a2 that is outside the discrimination region a3. In the case of the flick operation w3, a starting position and an ending position of a path that accompanies the flick operation are detected inside the discrimination region a3. In the case of the flick operation w4, a starting position and an ending position of a path that accompanies the flick operation are detected at positions inside the input region a2 that are outside the discrimination region a3.

In FIGS. 2C to 2E examples are illustrated of distinguishing a touch operation in the case of using the discrimination region a3. FIG. 2C illustrates an example of distinguishing a tap operation w5 that occurs inside the discrimination region a3 for example. In the case of the tap operation w5, contact and withdrawal are detected within a predetermined coordinates range. In the case of the tap operation w5, it is detected that the contact position is stationary within the predetermined coordinates range, and thereafter the operation finger or the like withdraws from the position within the predetermined coordinates range at which the contact position is stationary. Note that, a tap operation is also referred to as a "fixed-point touch".

FIG. 2D illustrates an example of distinguishing the flick operation w2 that occurs between the inside of the discrimination region a3 and the outside of the discrimination region a3 for example. In the case of the flick operation w2, for example, contact is detected inside the discrimination region a3, and withdrawal is detected outside the discrimination region a3. In the case of the flick operation w2, for example, movement is detected between the relevant coordinates from a position inside the discrimination region a3 at which the contact occurs to a position at which withdrawal occurs outside the discrimination region a3. Note that, movement between a contact position and a withdrawal position is also detected in a similar manner with respect to the other flick operations w1 and w3 to w4. Note that, as described above, in the case of the flick operations w1 to w4, a movement direction and the like that accompany a movement are specified.

FIG. 2E illustrates an example of distinguishing a touch operation in a case where two flick operations occur consecutively. The information processing apparatus 10 of the present embodiment distinguishes two consecutive flick operations by adopting the discrimination region a3 provided inside the input region a2 as an intermediary region. Note that, to distinguish the flick operation in FIG. 2E from the flick operation illustrated in FIG. 2D, the single flick operation described using FIG. 2D is also referred to as a "one-stage flick", and the flick operation illustrated in FIG. 2E is also referred to as a "two-stage flick".

As illustrated in FIG. 2E, in the case of the two-stage flick, two flick operations w1 and w2 occur consecutively in a manner that adopts the discrimination region a3 as an intermediary region. In the case of the two-stage flick, for example, contact for the flick operation w1 is detected outside the discrimination region a3, and after the contact halts within the discrimination region a3 for a certain time period without being withdrawn after the movement, the second-stage flick operation w2 is performed in continuation from the flick operation w1 by taking the position at which the contact halted as the starting position thereof. In this case, the movement directions of the first-stage flick operation w1 and the second-stage flick operation w2 that continue via the discrimination region a3 may be specified.

Here, as described above, the movement direction of a flick operation can be expressed as a relative angle between the X-axis and a path that links coordinates of contact positions that are acquired as time series data.

FIG. 2F is a view for describing movement directions in a case where the right direction from an intersecting (cross) point between the X-axis and the Y-axis is taken as "0°", and relative directions with respect thereto are defined in a left rotational direction. Note that, in FIG. 2F, a reference axis Xs is a reference axis that is parallel to the X-axis on the touch panel, and similarly a reference axis Ys is a reference axis that is parallel to the Y-axis. On a path of contact positions acquired as time series data, a movement direction can be expressed as a direction from a coordinate position acquired earlier as time series data to a coordinate position acquired later as time series data. In a case where the intersecting point between the reference axis Xs and the reference axis Ys is taken as the coordinate position that is acquired earlier, for example, a case where the normal direction of the reference axis Xs is taken as "0°", a movement direction can be expressed as an angle between "0°" and "360°" in the left rotational direction.

The movement directions illustrated in FIG. 2F represent an example in which the angle from "0°" to "360°" is segmented into eight equal segments. As illustrated in FIG. 2F, in a case where the angle of one rotation in the left rotational direction is segmented into eight equal segments, for example, when the normal direction of the reference axis Xs is taken as "0°", an angle range from "337.5°" or more to less than "22.5°" may be defined as a "right direction" as illustrated in a region d1. Similarly, an "right-upper direction" that is illustrated in a region d2 can be defined as an angle range from "22.5°" or more to less than "67.5°", and an "upper direction" that is illustrated in a region d3 can be defined as an angle range from "67.5°" or more to less than "112.5°". A "left-upper direction" that is illustrated in a region d4 can be defined as an angle range from "112.5°" or more to less than "157.5°", and a "left direction" that is illustrated in a region d5 can be defined as an angle range from "157.5°" or more to less than "202.5°". A "left-lower direction" that is illustrated in a region d6 can be defined as an angle range from "202.5°" or more to less than "247.5°", and a "lower direction" that is illustrated in a region d7 can be defined as an angle range from "247.5°" or more to less than "292.5°". A "right-lower direction" that is illustrated in a region d8 can be defined as an angle range from "292.5°" or more to less than "337.5°". Note that, a "center" that is illustrated in a region d9 in the example illustrated in FIG. 2F represents, for example, a stopped state in which a change in the vertical/horizontal direction of the contact position remains within a predetermined coordinates range, and indicates that such a change is not regarded as a movement.

As illustrated in FIG. 2F, by segmenting movement directions that accompany flick operations into eight directions, the information processing apparatus 10 can achieve the following advantageous effect. For example, in the case of the "two-stage flick (double flick)" described referring to FIG. 2E, it is possible for the information processing apparatus 10 to distinguish at least 64 kinds of input items by combining eight kinds of directions of the first-stage flick from a peripheral region and eight kinds of directions of the second-stage flick. In this case, for example, a character or a control code or the like can be mentioned as an example of an input item.

Next, information input that is based on combination patterns in which the touch operations described referring to FIG. 2A to 2F and movement directions are combined will be described. Note that, hereafter, input of kana characters and the like is described as one example of information input.

(Character Input Operation)

Figure 3A:
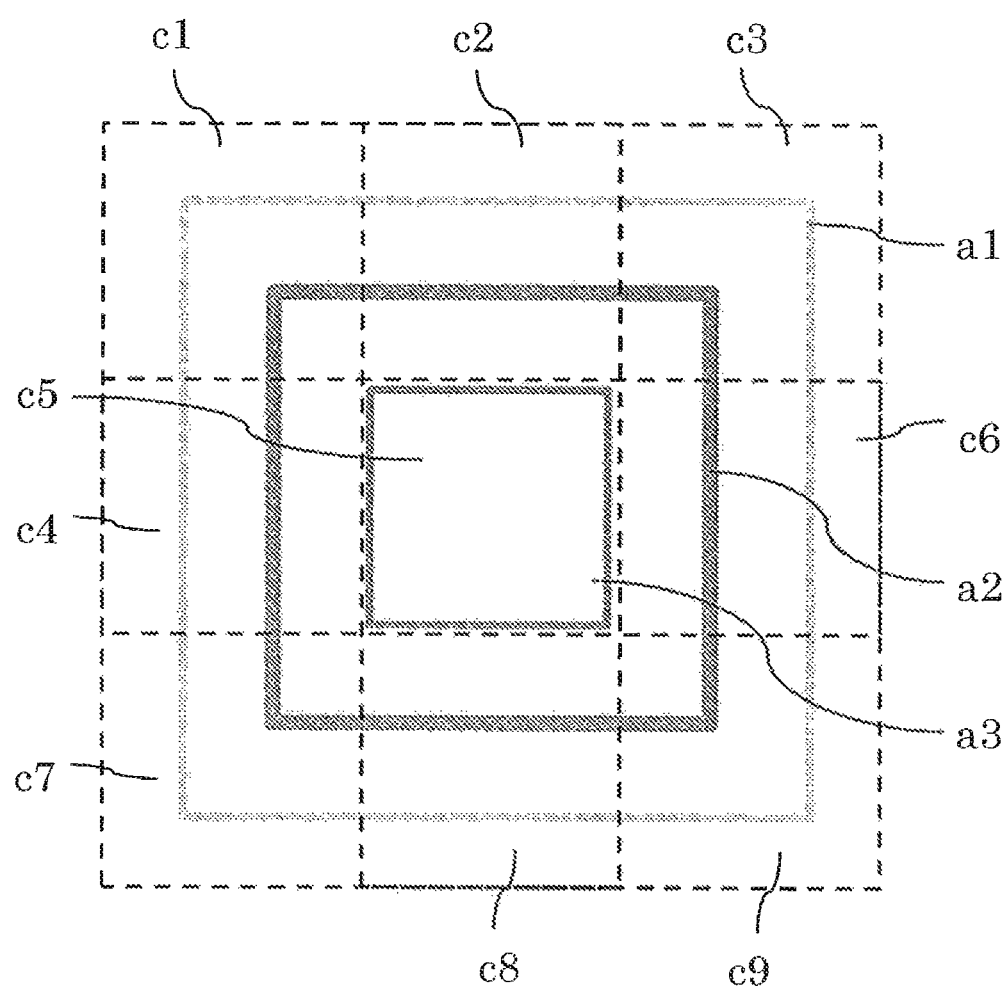
FIG. 3A is a diagram illustrating a touch panel region with respect to movement directions in a case where the movement directions are divided into eight directions.

FIG. 3A is an explanatory diagram for describing positions in a layout for character input that is divided into eight directions that are centered on the discrimination region a3, in which the centers of the touch panel region a1, the input region a2 and the discrimination region a3 are aligned. The touch panel region a1, the input region a2 and the discrimination region a3 are described above referring to FIGS. 2A to 2C. In the explanatory diagram in FIG. 3A, starting characters for input are arranged in respective regions c1 to c9 that are separated by broken lines. As long as the size of the starting characters arranged in the respective regions includes the input region a2, the size may be a large size that extends to outside the input region a2. The region c5 corresponds to the discrimination region a3.

An input interface that relates to character input of a portable telephone or a smartphone or the like may be represented by, for example, combining a "two-stage flick" that is started from any of the regions c1 to c4 and c6 to c9 that are divided into eight directions and a "one-stage flick" that takes the center region c5 as a starting position.

Figure 3B:
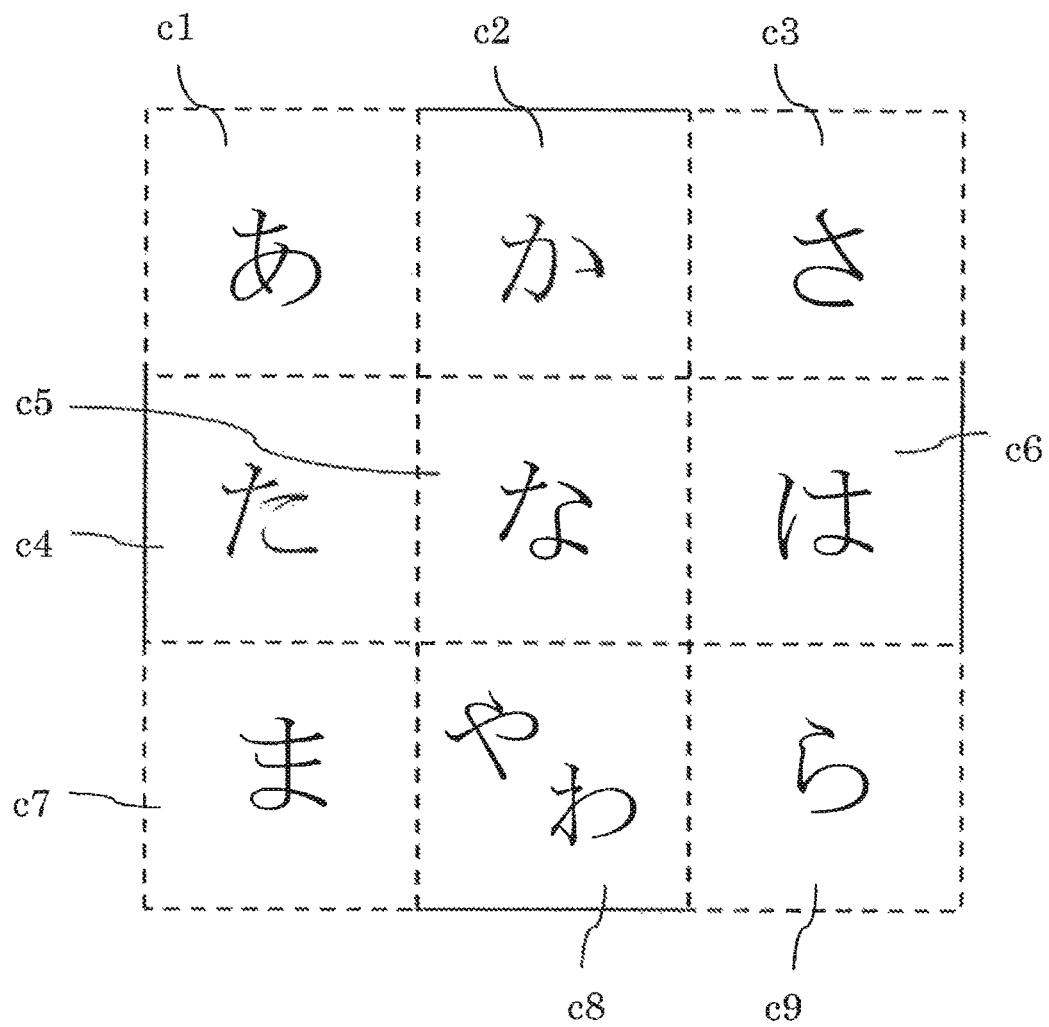
FIG. 3B is a diagram illustrating an example of a character input layout in which the "a" column of each row of the Japanese 50-sound chart is arranged.

In FIG. 3B, an example is illustrated of a layout for kana character input in which the column "a" of the respective rows, namely, "a", "ka", "sa", "ta", "na", "ha", "ma", "ya", "ra", "wa" of the Japanese 50-sound chart are arranged. According to the character input layout illustrated in FIG. 3B, kana characters belonging to the column "a", namely "a", "ka", "sa", "ta", "na", "ha", "ma", "ya", "ra", "wa" are arranged in the regions c1 to c9 that are divided into nine regions, respectively. However, the character input layout may be a layout other than that illustrated in FIG. 3B.

In the example illustrated in FIG. 3B, the character "na" is arranged in the center region c5. Relative to the central character "na", the character "a" is arranged in the region c1 in the left-upper direction, the character "ka" is arranged in the region c2 in the upper direction, the character "sa" is arranged in the region c3 in the right-upper direction, and the character "ta" is arranged in the region c4 in the left direction. Similarly, relative to the central character "na", the character "ha" is arranged in the region c6 in the right direction, the character "ma" is arranged in the region c7 in the left-lower direction, and the characters "ya" and "wa" are arranged in the region c8 in the lower direction. Relative to the central character "na", the character "ra" is arranged in the region c9 in the right-lower direction. However, the layout of characters for inputting kana characters is not limited to the layout illustrated in FIG. 3B.

Figure 3C:
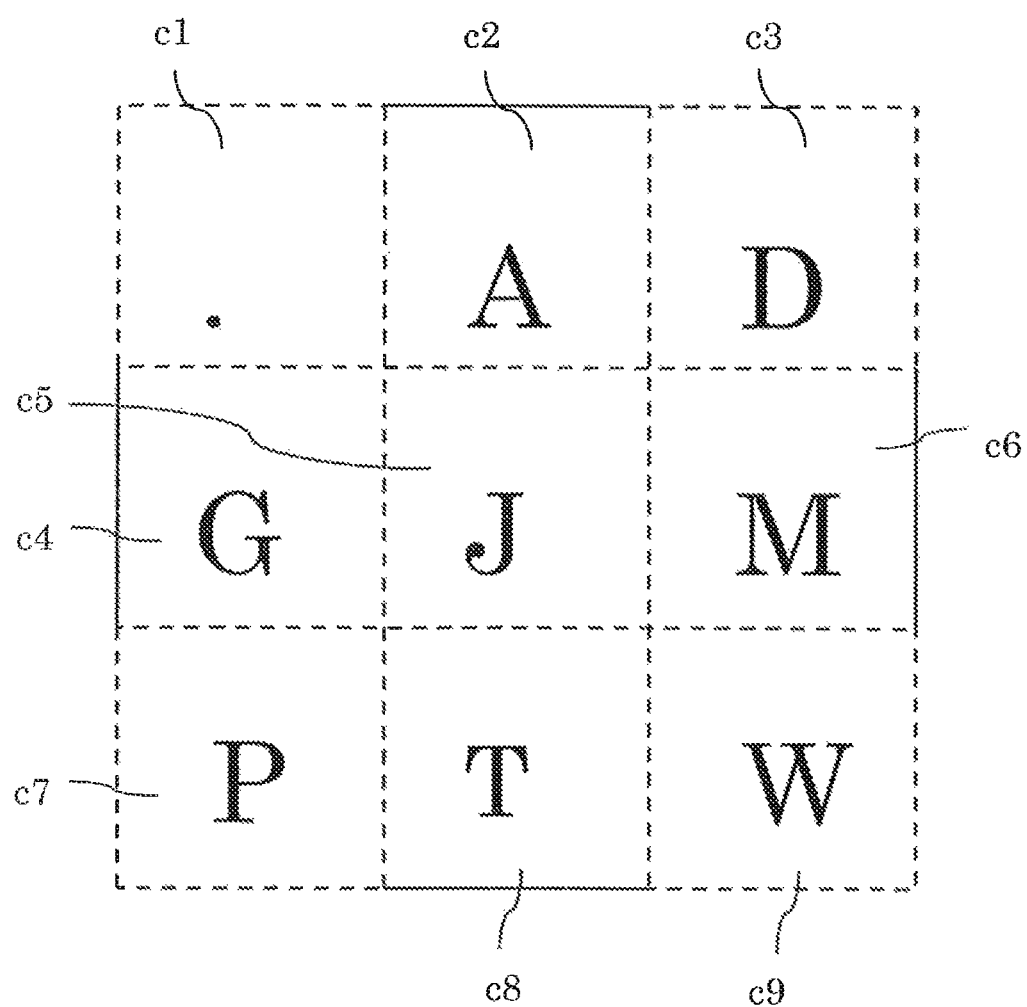
FIG. 3C is a diagram illustrating an example of the layout of English characters that are divided into nine sections.

In the case of English characters such as "ABC" that are other than the kana characters also, likewise, the English characters may be arranged in the regions c1-c9 that are divided into nine regions. FIG. 3C illustrates an example of the layout of English characters in the regions c1-c9 that are divided into nine regions.

In the example in FIG. 3C, the English alphabet character "J" is arranged in the center region c5. A special symbol such as "." is arranged in the region c1 in the left-upper direction relative to the center region c5, the English alphabet character "A" is arranged in the region c2 in the upper direction relative to the center region c5, the character "D" is arranged in the region c3 in the right-upper direction, and the character "G" is arranged in the region c4 in the left direction. Similarly, relative to the center region c5, the English alphabet character "M" is arranged in the region c6 in the right direction, the English alphabet character "P" is arranged in the region c7 in the left-lower direction, and the English alphabet character "T" is arranged in the region c8 in the lower direction. Relative to the center region c5, the English character "W" is arranged in the region c9 in the right-lower direction. However, the layout of characters for inputting English characters is not limited to the example illustrated in FIG. 3C.

Hereafter, a character input operation that takes the input of a kana character illustrated in FIG. 3B as an object will be described.

(Two-Stage Flick)

Figure 3D:
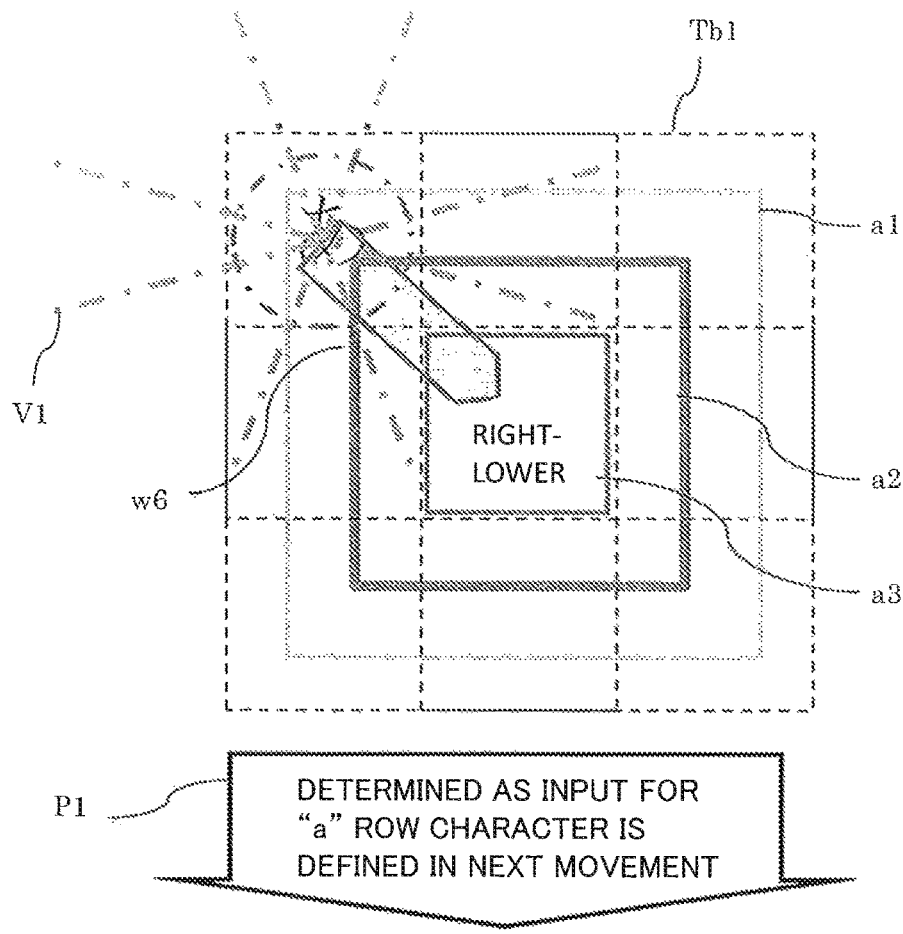
FIG. 3D is a diagram illustrating an input operation that uses a two-stage flick.
Figure 3D:
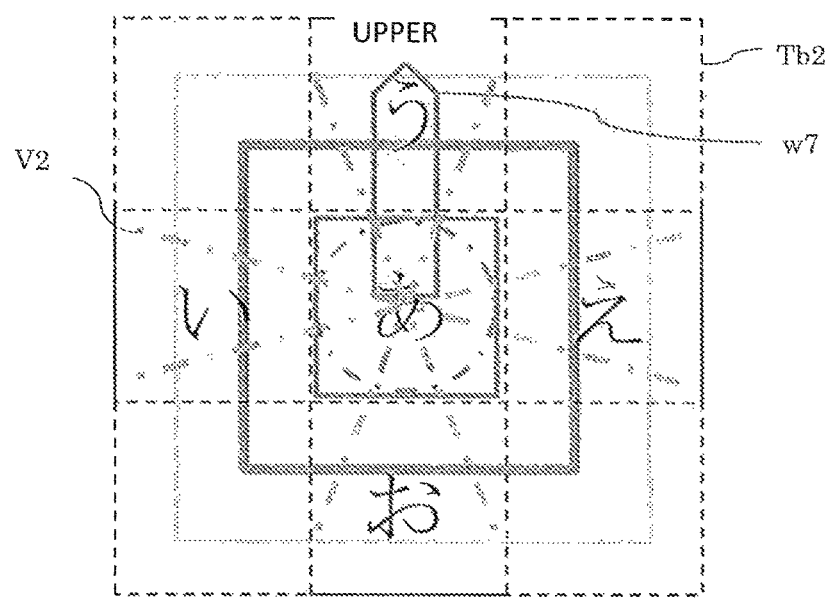

FIG. 3D is a view for describing an input operation that uses a two-stage flick. Note that, in FIG. 3D, a character input layout Tb1 represents a character input layout for inputting the kana characters illustrated in FIG. 3B. Further, Tb2 represents an example in which, after input of the row "a" is specified, the respective columns of the row "a" are arranged in cross directions. Radial broken lines V1 and V2 represent angle ranges of movement directions in a case where the angle from "0°" to "360°" is segmented into the eight directions illustrated in FIG. 2F, of which the broken lines V1 denote movement directions when starting an operation from the character "a" in Tb1, and the broken lines V2 denote movement directions when starting an operation from the character "a" in Tb2. Further, the touch panel region a1, the input region a2 and the discrimination region a3 represent the same regions as in FIG. 3A.

In the explanatory diagram in FIG. 3D, it is assumed that a flick operation w6 occurs from a region in which the character "a" is arranged towards the discrimination region a3. In the case of the flick operation w6 that is a two-stage flick, a path is detected that takes the region on the left upper side as a starting position, and first passes through the input region a2 and takes the central discrimination region a3 as a stopping position. The information processing apparatus 10, for example, detects the flick operation w6 from the region of the character "a" in Tb1 towards the region of the discrimination region a3, and determines the flick operation w6 as the first stage of a two-stage flick. As indicated in a block P1, the information processing apparatus 10 specifies the flick operation w6 as a character input operation with respect to the row "a" based on the movement direction towards the bottom right.

The information processing apparatus 10 that specified the detected flick operation w6 as a character input operation with respect to the row "a", for example, switches the character input layout from Tb1 to Tb2. The character input layout Tb2 illustrated in FIG. 3D is an example in which the respective columns of the row "a" are, for example, arranged in cross directions. In the character input layout Tb2, relative to the center region, the character "u" is arranged in a region in the upper direction, the character "o" is arranged in a region in the lower direction, the character "i" is arranged in a region in the left direction, and the character "e" is arranged in a region in the right direction. Note that, for example, the character "a" is arranged in the center region.

It is assumed that a flick operation w7 occurs in a continuous manner from the flick operation w6. In the case of the flick operation w7, a path is detected that takes the center region as a starting position and takes the region in the upper direction as an ending position. The information processing apparatus 10, for example, detects the flick operation w7 from the central discrimination region a3 towards the region in the upper direction, and specifies the character item "u" that is included in the row "a". Based on the two-stage flick, the information processing apparatus 10 specifies the row "a" with respect to the character item group, and specifies the character item "u" from among the specified character item group. The specified character "u" is, for example, reflected as an input character in an application program (hereafter, also referred to as "application") that relates to the character input processing.

Note that, in the character input layout Tb2, for example, in the case of specifying the character item "a" included in the row "a", it is sufficient to withdraw the operation finger or the like that is stopped in the discrimination region a3 from the touch panel. In the character input layout Tb2, the respective characters included in the row "a" are arranged in cross directions that include the center region. However, for example, the respective characters of the row "a" may also be arranged in a fan shape in which "a" is arranged in a region in the left-upper direction, "i" is arranged in a region in the upper direction, "u" is arranged in a region in the right-upper direction, "e" is arranged in a region in the left direction, and "o" is arranged in a region in the right direction. It is sufficient if the character input layout enables at least the identification of a movement direction of a flick operation that is executed in continuation from the flick operation w6 that is stopped in the center region.

As described above, the information processing apparatus 10 may specify an information item group that is a character item group, and may specify an input item from the specified item group based on a two-stage flick.

(One-Stage Flick)

Figure 3E:
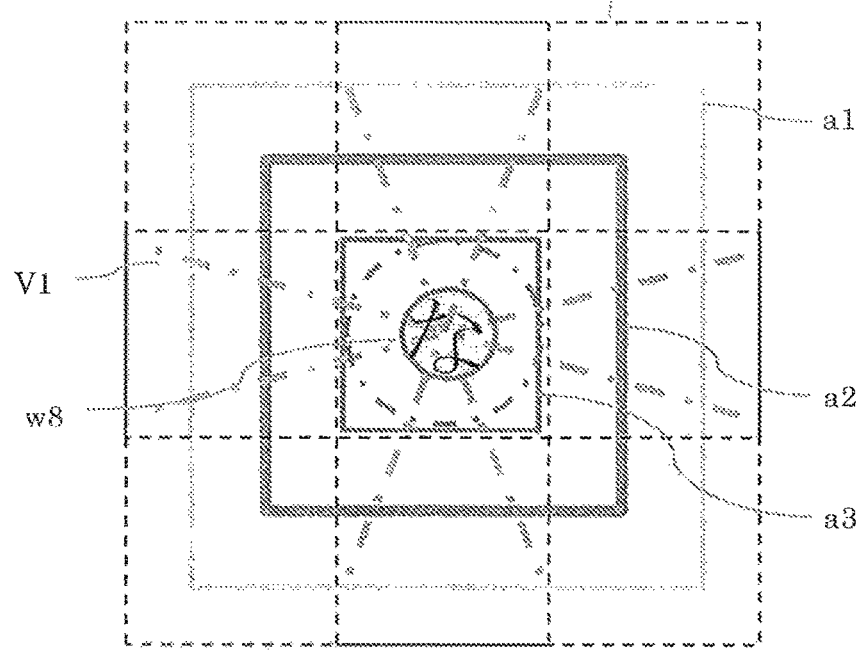
FIG. 3E is a diagram illustrating an input operation that uses a one-stage flick.
Figure 3E:
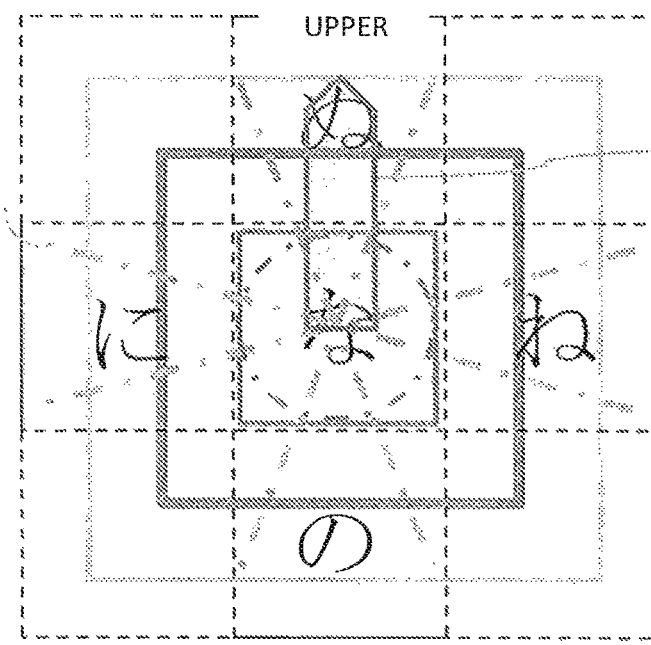

FIG. 3E is an explanatory diagram for describing an input operation that uses a one-stage flick (single flick). Note that, the character input layout Tb1 in FIG. 3E represents a character input layout for inputting the kana characters illustrated in FIG. 3B. Further, Tb3 represents an example in which, after input of the row "na" is specified, the respective columns of the row "na" are arranged in cross directions. Further, radial broken lines V1 and V2 represent angle ranges of movement directions in a case where the angle from "0" to "360°" is segmented into the eight directions illustrated in FIG. 2F, of which the broken lines V1 denote movement directions when starting an operation from the character "na" in Tb1, and the broken lines V2 denote movement directions when starting an operation from the character "na" in Tb3.

In a case where input of a character in the row "na" in the character input layout Tb1 is performed, a touch operation w8 with respect to the discrimination region a3 in which the character "na" is arranged is detected. The information processing apparatus 10, for example, detects contact onto the region in which the character "na" is displayed, and as indicated in a block P2, specifies a character input operation with respect to the row "na". Subsequently, the information processing apparatus 10 detects a flick operation that takes a position inside the discrimination region a3 as a starting position, and specifies character candidates included in the row "na".

The information processing apparatus 10 that specified the detected touch operation w8 as a character input operation with respect to the row "na", for example, switches the character input layout from Tb1 to Tb3. The character input layout Tb3 illustrated in FIG. 3E is an example of a character input layout in which the respective columns of the row "na" are, for example, arranged in cross directions. In the character input layout Tb3, relative to the center region, the character "nu" is arranged in a region in the upper direction, the character no is arranged in a region in the lower direction, the character "ni" is arranged in a region in the left direction, and the character "ne" is arranged in a region in the right direction. Note that, for example, the character "na" is arranged in the center region. Japanese kana characters "na", "ni", "nu", "ne" and "no" are written as below.

" な ", " に ", " ぬ ", " ね ", " の "

It is assumed that after the touch operation w8 is detected, a flick operation w9 that takes a position within the central discrimination region a3 as a starting position occurs in a continuous manner from the touch operation w8. In the case of the flick operation w9, a path is detected that takes a position within the central discrimination region a3 as a starting position, and takes the region in the upper direction as an ending position. The information processing apparatus 10, for example, detects the flick operation w9 from the central discrimination region a3 towards the region in the upper direction, and specifies the character candidate "nu" that is included in the row "na". The information processing apparatus 10 specifies the row "na" as the character item group based on the touch operation that starts from within the discrimination region a3. Subsequently, based on the flick operation w9 (one-stage flick) that takes a position inside the central discrimination region a3 as a starting position that continues from the touch operation, the information processing apparatus 10 specifies the character item "nu" from among the specified character item group. The specified character "nu" is, for example, reflected as an input character in an application that relates to the character input processing.

As described above, according to the information processing apparatus 10, by means of a touch operation that starts from inside the central discrimination region a3, items including character candidates as targets are specified from among character item groups. Subsequently, in the information processing apparatus 10, a character candidate (input item) that is the target is specified by a one-stage flick that continues from the touch operation and that takes a position inside the central discrimination region a3 as a starting position.

Note that, in the example of the character input layout Tb3, in the case of specifying the character candidate "na" included in the row "na", for example, it is sufficient to withdraw the operation finger or the like that is brought into contact with the discrimination region a3 in the touch operation, from the touch panel without performing a flick operation.

In the character input layout Tb3, the respective characters included in the row "na" are arranged in cross directions that include the center region. However, for example, the respective characters included in the row "na" may also be arranged in a fan shape in which "na" is arranged in a region in the left-upper direction, "ni" is arranged in a region in the upper direction, "nu" is arranged in a region in the right-upper direction, "ne" is arranged in a region in the left direction, and no is arranged in a region in the right direction. In this case also, the information processing apparatus 10 may specify the character candidate that is the target based on the movement direction of the one-stage flick that takes the center region as a starting position.

Further, in the case of a one-stage flick from outside the discrimination region a3 to outside the discrimination region a3, for example, it is possible to cause the one-stage flick to be specified as an operation such as switching between character modifiers such as "a voiced sound symbol, a semi-voiced sound symbol and a lower-case character" or switching an input mode to change from kana characters to a character type such as English characters. The aforementioned one-stage flick for changing character modifiers or the input mode or the like can be specified by the following flick operation.

That is, the input region a2 that is outside the discrimination region a3 is adopted as the starting position of the flick operation. It is sufficient that the withdrawal position of the operation finger or the like that is moved in the flick operation is at a position in the input region a2 that is outside the discrimination region a3, and that is a different position to the starting position. Note that, in a case where the flick operation passes through the discrimination region a3, it is sufficient for the operation finger or the like to move to the input region a2 that is outside the discrimination region a3 without stopping inside the discrimination region a3.

Hereunder, an example is described of the above described one-stage flick that relates to changing a character modifier or an input mode or the like. The character that is the object of the character modifier is the character that is specified by an input operation immediately prior to the one-stage flick.

Voiced Sound Symbol Modifier:

The information processing apparatus 10 detects a touch operation that takes a region outside the discrimination region a3 as a contact starting position of a one-stage flick, and in which the operation finger or the like is moved in the right-lower direction and withdraws at a position that is outside the discrimination region a3. In a case where the character specified by an input operation immediately prior to the one-stage flick is "ha", the character "ha" is substituted with the voiced sound symbol character "ba" as a result of the one-stage flick.

Semi-Voiced Sound Symbol Modifier:

The information processing apparatus 10 detects a touch operation that takes a region outside the discrimination region a3 as a contact starting position of a one-stage flick, and in which the operation finger or the like is moved in the right-upper direction and withdraws at a position that is outside the discrimination region a3. In a case where the character specified by an input operation immediately prior to the one-stage flick is "ha", the character "ha" is substituted with the semi-voiced sound symbol character "pa" as a result of the one-stage flick. Japanese kana characters "ha", "ba", and "pa" are written as below.

"は", "ば", "ぱ"

Lower-Case Character Modifier:

The information processing apparatus 10 detects a touch operation that takes a region outside the discrimination region a3 as a contact starting position of a one-stage flick, and in which the operation finger or the like is moved in the lower direction and withdraws at a position that is outside the discrimination region a3. In a case where the character specified by an input operation immediately prior to the one-stage flick is "TSU", the character "TSU" is substituted with "tsu" that is the lower-case version of "TSU", as a result of the one-stage flick. Japanese kana characters "TSU" and "tsu" are written as below.

"つ", "っ" (Small Size)

Character Deletion:

The information processing apparatus 10 detects a touch operation that takes a region outside the discrimination region a3 as a contact starting position of a one-stage flick, and in which the operation finger or the like is moved in the left direction and withdraws at a position that is outside the discrimination region a3. The character specified by an input operation immediately prior to the one-stage flick is deleted.

Input Mode Switching:

The information processing apparatus 10 detects a touch operation that takes a region outside the discrimination region a3 as a contact starting position of a one-stage flick, and in which the operation finger or the like is moved in the right direction and withdraws at a position that is outside the discrimination region a3. Note that, the input mode is switched in the order of, for example, kana/kanji→alphanumeric characters→kana/kanji→ . . . each time a switching operation is performed.

Figure 3F:
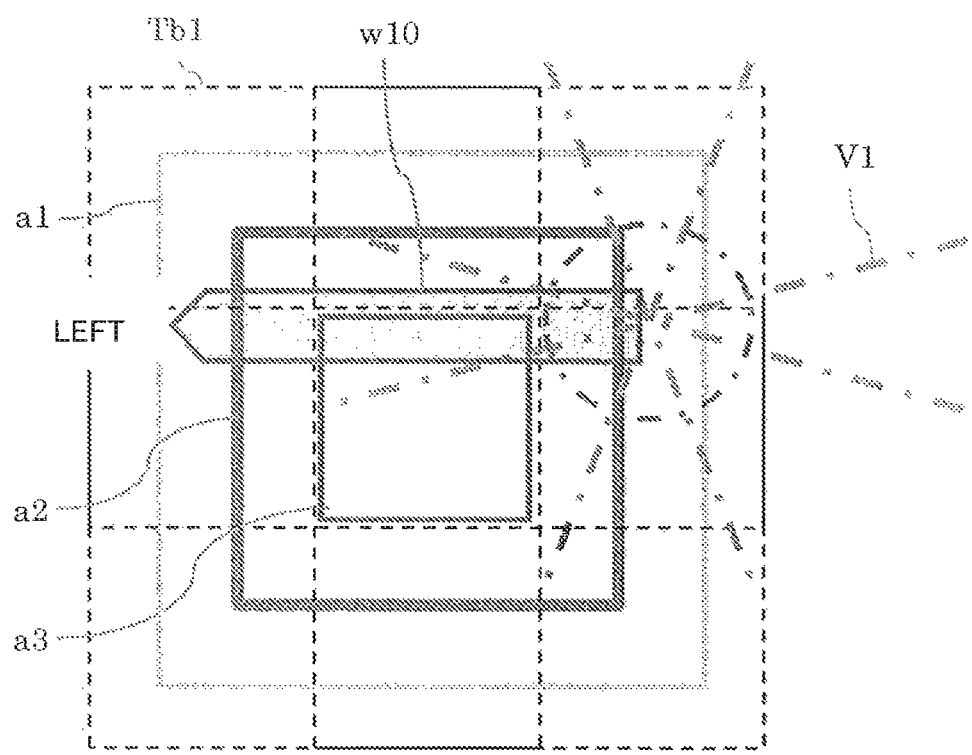
FIG. 3F is a diagram illustrating an operation to delete a character that uses a one-stage flick.

FIG. 3F is an explanatory view for describing an operation to delete a character that uses a one-stage flick. In the operation to delete a character, the one-stage flick is performed from a position outside the discrimination region a3 to a position outside the discrimination region a3. Note that, the character input layout Tb1 in FIG. 3F represents the character input layout for input of kana characters that is illustrated in FIG. 3B. Further, the radial broken lines V1 represent an angle range of movement directions in a case where the angle from "0°" to "360°" is segmented into eight directions as illustrated in FIG. 2F, and denote movement directions when starting a touch operation.

In a case where an operation to delete a character is performed using a one-stage flick, a flick operation w10 that takes a region outside the discrimination region a3 as a starting position is detected. The flick operation w10 moves in the left direction, passes through the discrimination region a3, and withdraws from contact with the touch panel at a position in the region outside the discrimination region a3. In the case of the flick operation w10, for example, a path is detected that takes the right-side region outside the discrimination region a3 as a starting position, and the left-side region outside the discrimination region a3 as a withdrawal position. The information processing apparatus 10, for example, detects a one-stage flick that passes through the discrimination region a3 in the left direction from the right side thereof, and performs processing to delete the character item that is inputted immediately prior to the one-stage flick.

The information processing apparatus 10 of the present embodiment may specify an item group and an input item of information that is an input target based on a movement direction that accompanies a flick operation from outside the discrimination region a3 to inside the discrimination region a3. Similarly, the information processing apparatus 10 may specify an item group and an input item of information that is an input target based on a movement direction that accompanies a flick operation from inside the discrimination region a3 to outside the discrimination region a3, and based on a movement direction that accompanies a flick operation from outside the discrimination region a3 to outside the discrimination region a3. It is sufficient that the touch panel of the information processing apparatus 10 of the present embodiment is separated into, for example, the discrimination region a3 and a region on the outer circumference of the discrimination region a3, and that the coordinate accuracy is of a level that enables identification of a direction in a case where a touch operation moves on the touch panel.

Figure 3G:
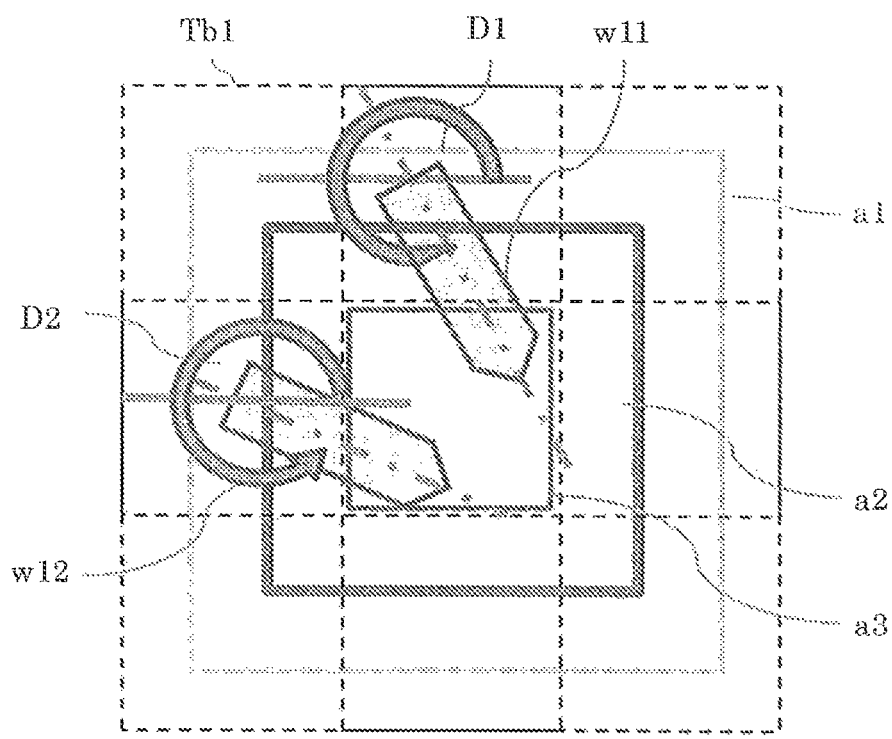
FIG. 3G is a diagram illustrating an input interface of the present embodiment.

FIG. 3G is an explanatory diagram for describing the input interface of the present embodiment. Flick operations w11 and w12 that are illustrated in FIG. 3G are touch operations that each adopt a position in the region outside the discrimination region a3 as a starting position and a position inside the discrimination region a3 as a withdrawal position. A movement direction D1 and a movement direction D2 are in the "right-lower" range in FIG. 2F. The flick operations w11 and w12 are, for example, flick operations that are started from c2 and c4 illustrated in FIG. 3A, respectively, and that stop in the determination region a3 after moving in the right-lower direction. Note that, an angle range that corresponds to the right-lower direction is a range from "292.5°" or more to less than "337.5°", when taking the right direction of the reference axis Xs as "0°".

According to the information processing apparatus 10 of the present embodiment, the flick operations w11 and w12 may each be specified as, for example, an input operation with respect to the row "a" with respect to the character input illustrated in FIG. 3B. Since the information processing apparatus 10 detects a movement direction of a contact position, the occurrence of input errors is suppressed even in a case where the character region is narrow. Consequently, even if the start of contact occurs in a region in which the character "ka" or "ta" that are adjacent to the character "a" are arranged among the characters illustrated in FIG. 3B, the information processing apparatus 10 may suppress the occurrence of an input error. The information processing apparatus 10 may suppress the occurrence of a pressing error or the like even in the case of, for example, a narrow touch panel in which erroneous contact onto an adjacent operation object is liable to occur.

Further, for example, it is assumed that the movement speed of a flick operation is 100 mm/sec or less, and that a sampling period for detecting a contact position is 20 ms or less. In this case, if there is a width of, for example, 4 mm or more, it is possible to detect the coordinates of at least two points of a flick operation.

If it is assumed that a contact area of a finger with respect to the device surface is an area with a diameter of 7 mm, when the discrimination region a3 includes a contact surface with a diameter of 7 mm it is possible to detect a movement produced by a flick operation from inside the discrimination region. As one example, a rectangular region of 7 mm×7 mm that may include a portion of a contact area with a diameter of 7 mm and in which detection of a movement of a flick operation is possible is adopted as the discrimination region a3. Note that, a contact area of a finger or the like is generally an elliptic shape, and the touch panel detects a center point thereof as the coordinates.

Figure 3H:
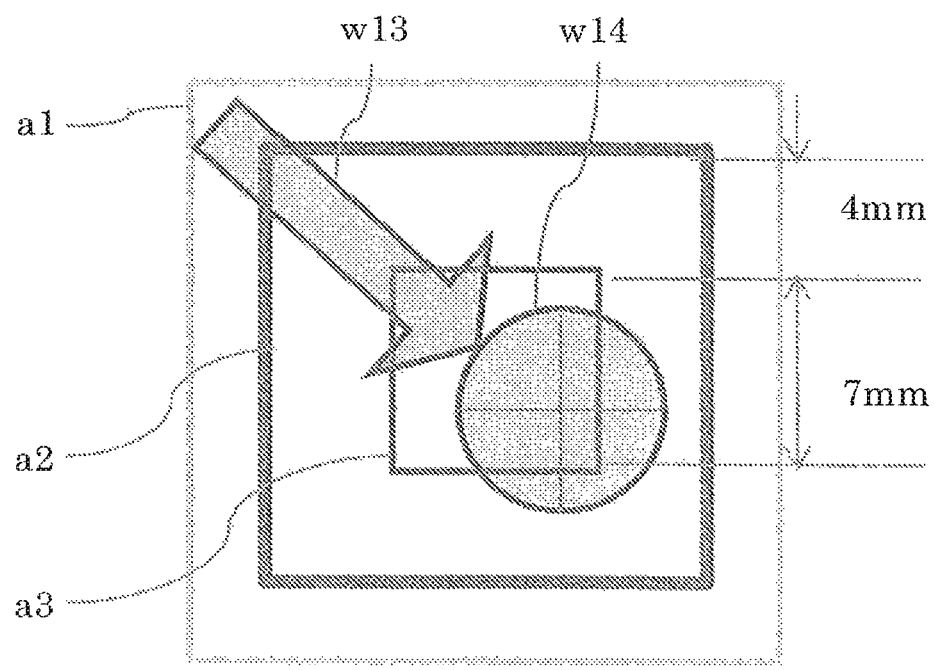
FIG. 3H is a diagram illustrating the size of a discrimination region.

FIG. 3H is an explanatory diagram for describing a case where a rectangular region of 7 mm×7 mm is adopted as the discrimination region a3. Note that, FIG. 3H illustrates an example in a case where the touch panel region a1, the input region a2 and the discrimination region a3 are each formed in a rectangular shape. Further, FIG. 3H illustrates an example in a case where the touch panel region a1, the input region a2 and the discrimination region a3 are set in concentric shapes by making the respective center positions thereof common.

As illustrated in FIG. 3H, a rectangular region of 7 mm×7 mm is adopted as the discrimination region a3, and a space between the discrimination region a3 and the outer circumference of the input region a2 is made a width of a minimum of 4 mm. In a case where the touch panel region a1 and the input region a2 match, it is sufficient that the size of the touch panel region a1 is, for example, an area of 15 mm×15 mm or more. Therefore, for example, even in the case of a touch panel region a1 that is about as narrow as a wristwatch, it is possible to input information by a touch operation that uses a finger, such as by a flick operation w13 or a tap operation w14. Although information displayed by a display device that is superimposed on a touch panel is hidden by the finger that performs the operation and is thus difficult to see, since the position of the discrimination region a3 can be estimated by checking the area of the input region a2 by visual observation, it is possible to perform an input operation by a flick operation that is accompanied by a movement direction or by a fixed-point touch or the like.

Further, according to the information processing apparatus 10 of the present embodiment, input operations are possible in eight directions plus one (a center touch) with respect to the conventional input interface, namely, a numeric keypad layout. Therefore, it is possible to display operation objects of the numeric keypad layout and to perform an input operation with a shorter operating procedure in comparison to a case of determining an input item using a toggle method. The information processing apparatus 10 of the present embodiment can improve the operability of information input by a finger operation using a narrow touch panel.

[Architecture of Apparatus]

Returning to the explanatory view illustrated in FIG. 1, the information processing apparatus 10 of the present embodiment includes a CPU (Central Processing Unit) 11, a main storage device 12, an auxiliary storage device 13, an input device 14, an output device 15 and a communication device 16 which are connected to each other by a connection bus B1. Note that, FIG. 1 illustrates an example of common hardware architecture of the information processing apparatus such as a personal computer. The main storage device 12 and the auxiliary storage device 13 are recording mediums that are readable by the information processing apparatus 10. The CPU 11 is an example of a processor.

In the information processing apparatus 10, the CPU 11 expands a program stored in the auxiliary storage device 13 in a work area of the main storage device 12 so that the program is executable, and controls peripheral devices through execution of the program. By this means, the information processing apparatus 10 may realize a function that matches a predetermined purpose that is described above.

In the information processing apparatus 10 illustrated in FIG. 1, the CPU 11 is the central processing unit that controls the information processing apparatus 10 as a whole. The CPU 11 performs processing in accordance with a program stored in the auxiliary storage device 13. The main storage device 12 is a storage medium in which the CPU 11 caches the program and data and expands the work area. The main storage device 12 includes, for example, a RAM (Random Access Memory) and a ROM (Read Only Memory).

The auxiliary storage device 13 stores various kinds of programs and various kinds of data on a recording medium in a freely readable/writable state. The auxiliary storage device 13 is also referred to as an "external storage device". An OS (Operating System), various programs and various tables are stored in the auxiliary storage device 13. The OS, for example, provides an interface to managed resources to installed applications.

An application installed in the information processing apparatus 10 realizes an application function by using the interface to the resources that is provided by the OS. The OS includes a communication interface program that passes data to external devices or the like that are connected to the information processing apparatus 10 through the communication device 16. The external devices or the like include, for example, another information processing apparatus such as a PC or a server, or an external storage device or the like on an unillustrated network.

The auxiliary storage device 13 is, for example, an EPROM (Erasable Programmable ROM), a solid-state drive (SSD) device, a hard disk drive (HDD) or the like. A CD drive device, a DVD drive device, a BD drive device or the like may also be mentioned as examples of the auxiliary storage device 13. A silicon disk including a nonvolatile semiconductor memory (flash memory), a hard disk, a CD, a DVD, a BD, a USB (Universal Serial Bus) memory and a memory card or the like may be mentioned as examples of the recording medium.

The input device 14 accepts operation instructions and the like from a user or the like. The input device 14 is an input device such as a camera, an input button, the touch sensor 14a, a pointing device or a microphone. A keyboard, a wireless remote controller or the like may also be included as examples of the input device 14. Examples of the pointing device include a touch sensor 14a (touch panel) mouse, a trackball, and a joystick. Information inputted from the input device 14 is notified to the CPU 11 through the connection bus B1. For example, coordinate information that is detected with the pointing device is notified to the CPU 11 through the connection bus B1.

The output device 15 outputs data processed by the CPU 11 and data stored in the main storage device 12. The output device 15 includes a display device such as the LCD 15a, a CRT (Cathode Ray Tube) display, a PDP (Plasma Display Panel), an EL (Electroluminescence) panel or an organic EL panel. The output device 15 also includes an output device such as a printer or a speaker.

The communication device 16 is, for example, an interface with networks to which the information processing apparatus 10 connects or the like. The networks include, for example, a public network such as the Internet, a wireless network such as a cellular phone network, a LAN (Local Area Network) and a USB (Universal Serial Bus).

[Computer Programs Configuration]

Figure 4:
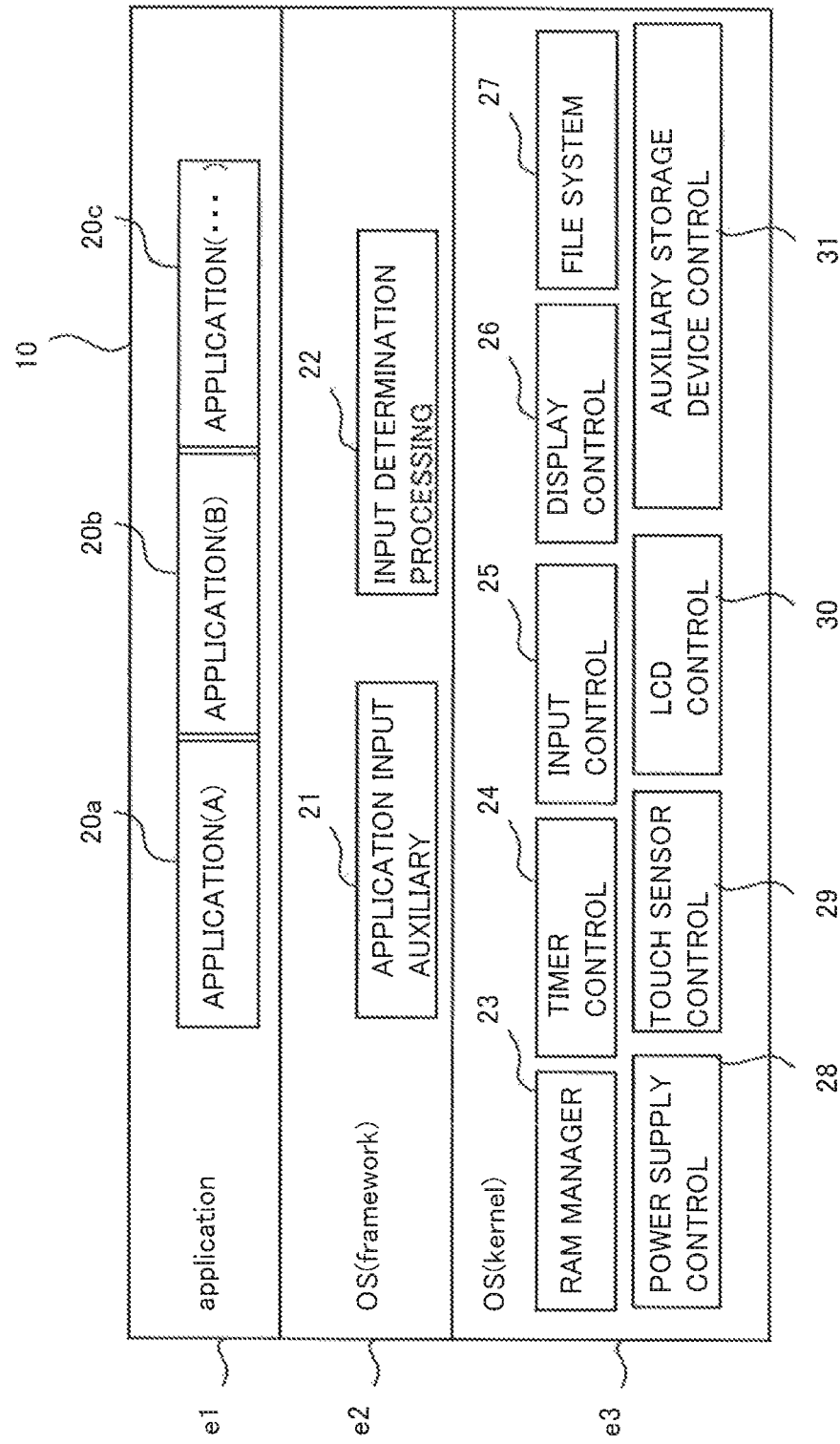
FIG. 4 is diagram illustrating an example of the computer program configuration of the information processing apparatus of the present embodiment.

FIG. 4 illustrates the computer program configuration of the information processing apparatus 10. The central processing unit (CPU 11) of the information processing apparatus 10 executes the processing of the present embodiment by means of computer programs. Hereunder, the central processing unit (CPU 11) executing processing by means of the respective programs illustrated in FIG. 4 is also referred to simply as a program executing processing.

As illustrated in FIG. 4, the computer programs of the information processing apparatus 10 include, for example, a layer e1 that executes applications, a layer e2 that functions as the framework of the OS, and a layer e3 that functions as the kernel of the OS. An application (A) 20a, an application (B) 20b and an application 20c in the layer e1 are, for example, a character input application, a spreadsheet application and a browser application or the like that are installed in the information processing apparatus 10. The respective applications provide respective application functions by using the interface to resources that is provided by the OS.

The layer e2 is an OS region that functions as an interface between each application and the kernel in the layer e3. The layer e2 includes, for example, an API (Application Programming Interface), a generic library and the like that are used by each application. An application input auxiliary 21 and an input determination 22 are included in the layer e2.

The application input auxiliary 21, for example, passes information such as an input character that was determined by the input determination 22 to an application. The input determination 22, for example, determines a type of touch operation and a movement direction and the like based on a contact position, a withdrawal position and the like of a touch operation that is detected in the input region a2 or the like. The input determination 22 then, for example, specifies information such as a corresponding input character based on the aforementioned items that are determined. Information that is specified by the input determination 22 is passed to the application input auxiliary 21.

The layer e3 is, for example, an OS region that manages the resources of the information processing apparatus 10. Process management, memory management, device management and the like with respect to the resources are performed by the layer e3 based on information that is notified through the layer e2. In the information processing apparatus 10, by means of the function of the layer e3, input/output to and from various devices accompanying execution of an application, and execution and stopping of various processes for reading and writing data from and to memory can be performed.

The layer e3 includes, for example, a RAM management unit (RAM manager) 23, a timer control 24, an input control 25, a display control 26, a file system 27, a power supply control 28, a touch sensor control 29, an LCD control 30 and an auxiliary storage device control 31. The RAM management unit 23, for example, performs operations to store data in the main storage device 12 and read out stored data and the like accompanying character input processing. The timer control 24, for example, controls a timer that measures a time period accompanying character input processing.

The input control 25, for example, performs control of input data that is inputted through the input device of the input unit 14 accompanying character input processing. The display control 26, for example, performs display control accompanying character input processing with respect to an input character that is specified by the character input processing. The file system 27, for example, manages various data files of the auxiliary storage device 13. The power supply control 28, for example, performs management control of a battery or the like of the information processing apparatus 10. The touch sensor control 29, for example, performs control of the touch sensor 14a accompanying character input processing. The LCD control 30 performs display control of display data that is displayed on, for example, the LCD 15a. The auxiliary storage device control 31, for example, stores data in the auxiliary storage device 13 and reads out stored data accompanying character input processing.

[Time Chart]

Figure 5:
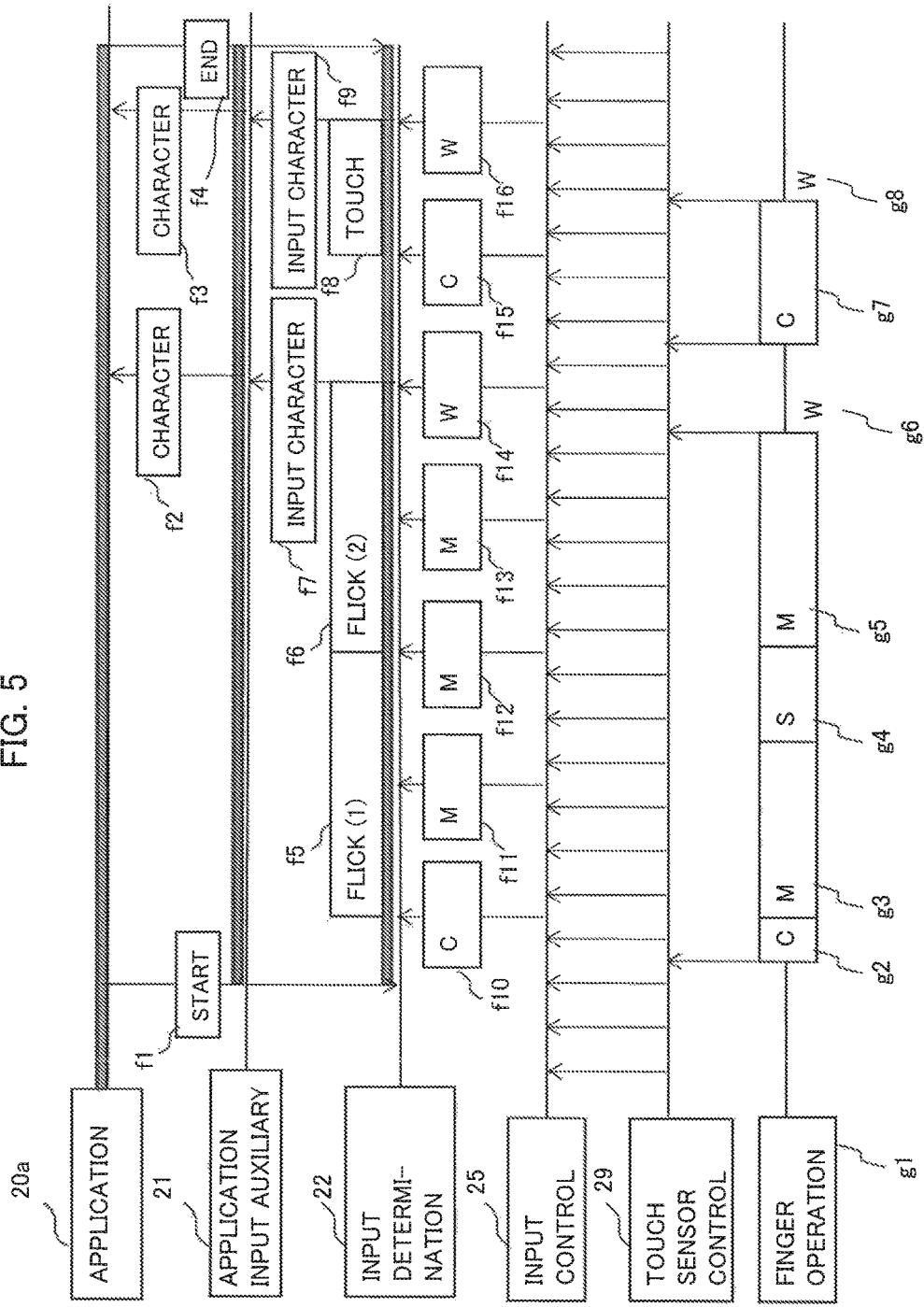
FIG. 5 is a diagram illustrating an example of a time chart relating to character input processing of the present embodiment.

FIG. 5 illustrates a time chart relating to character input processing. In the time chart illustrated in FIG. 5, the horizontal direction represents a time axis, and the vertical direction represents the respective computer program items illustrated in FIG. 4. The example illustrated in FIG. 5 includes respective computer programs for the application 20a, the application input auxiliary 21, the input determination 22, the input control 25 and the touch sensor control 29. Note that, in the information processing apparatus 10, for example, upon the power of the information processing apparatus 10 being turned on, coordinates that accompany a change in a physical quantity detected by the touch sensor 14a are notified to the touch sensor control 29 at fixed periods. The touch sensor control 29 passes the coordinates that are notified by the touch sensor 14a to the input control 25.

In the time chart illustrated in FIG. 5, a time when the application 20a is activated can be exemplified as a start f1 of character input processing. The application input auxiliary 21 and the input determination 22 execute the above described processing based on a read request or the like from a program that is executed after activation of the application 20a. The application input auxiliary 21 and the input determination 22 are continued until an end f4 of the application 20a.

In the time chart illustrated in FIG. 5, for example, input characters that are specified by the input determination 22 are notified to the application 20a through the application input auxiliary 21 (f2, f3). The input characters that are notified to the application 20a are displayed in a display region that displays input characters.

The input determination 22, for example, accepts coordinates relating to a touch operation during a period from the start f1 to the end f4 of the character input processing, through the input control 25. The accepted coordinates, for example, are temporarily stored in chronological order in a predetermined region of the main storage device 12. Storage of the accepted coordinates is performed, for example, through the RAM management unit 23 of the layer e3.

Further, the input determination 22, for example, starts input character determination processing upon receiving a notification (f10) from the input control 25 that detected a contact (g2) by an operation finger that occurred in the input region a2. The input determination 22, for example, detects a movement that accompanies a flick operation based on time series data (f10 to f14, f15 to f16) of the contact position at which the contact occurred in the input region a2. The input determination 22, for example, detects that a touch operation (g2 to g4) is a flick operation from a peripheral region outside the discrimination region a3 towards the inside of the discrimination region a3 based on a path that is based on the time series data (f10 to f12) for the contact position (f5). In FIG. 5, symbols of "C", "M", "S" and "W" indicate "contact", "movement", "stop" and "withdrawal".

The input determination 22, for example, specifies character items to which the input character belongs based on the movement direction of the flick operation (f5).

After specifying the character items, the input determination 22, for example, detects a movement of the flick operation that continues. For example, based on a path that is based on the time series data (f12 to f14) for the contact position, the input determination 22 detects that a continuing touch operation (g4 to g6) is a flick operation from inside the discrimination region a3 towards a peripheral region outside the discrimination region a3 (f6). Further, the input determination 22 specifies a movement direction based on a starting position and a withdrawal position of the contact by the flick operation.

The input determination 22, for example, specifies an input character based on the movement direction of the flick operation, and notifies the specified input character to the application input auxiliary 21 (f7). The input character determination processing that specifies an input character in the input determination 22 as well as an item to which the input character belongs ends with a character unit. Upon the end of the input character determination processing of a character unit, the specified input character is notified to the application 20a through the application input auxiliary 21 (f2). The input character that is notified to the application 20a is, for example, displayed on a display region that displays input characters.

The above described character input processing is, for example, repeated with respect to a touch operation that occurs in the input region a2 until the application 20a ends (f4). For example, the input determination 22 performs character input processing based on time series data (f8 to f9) for contact positions of a touch operation (g7 to g8) with respect to the inside of the discrimination region a3 that occurs after the aforementioned flick operation. The input determination 22, for example, detects a fixed-point touch (f8) based on the time series data (f8 to f9), specifies an input character (f9), and notifies the specified input character to the application 20a through the application input auxiliary 21 (f3).

Note that, in a case where a touch operation comes to a halt for a predetermined time period (for example, 0.1 second) or more when a variation (movement amount) of time series data of coordinates indicating the contact position is within a range that is less than a predetermined threshold value (for example, 1 mm or less), the input determination 22 determines that the touch operation has stopped. Further, identification of character items and identification of a character belonging to the character items may be performed by the application input auxiliary 21. In a case where identification of character items and an input character is performed with the application input auxiliary 21, it is sufficient that the input determination 22 notifies the kind of touch operation that used the discrimination region a3 as well as the movement direction and the like to the application input auxiliary 21.

[Processing Flow]

Figure 6A:
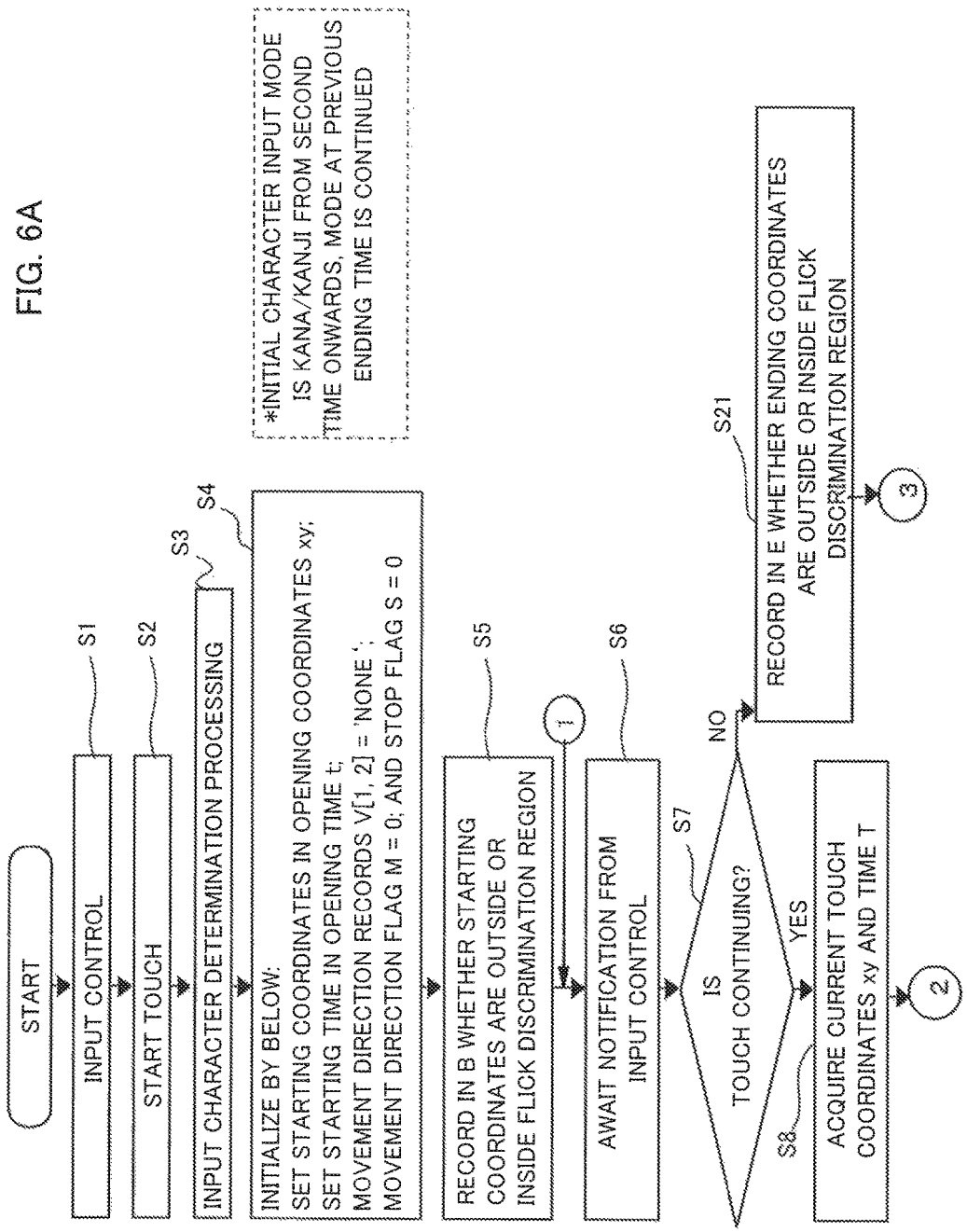
FIG. 6A is a flowchart illustrating character input processing of the present embodiment.
Figure 6B:
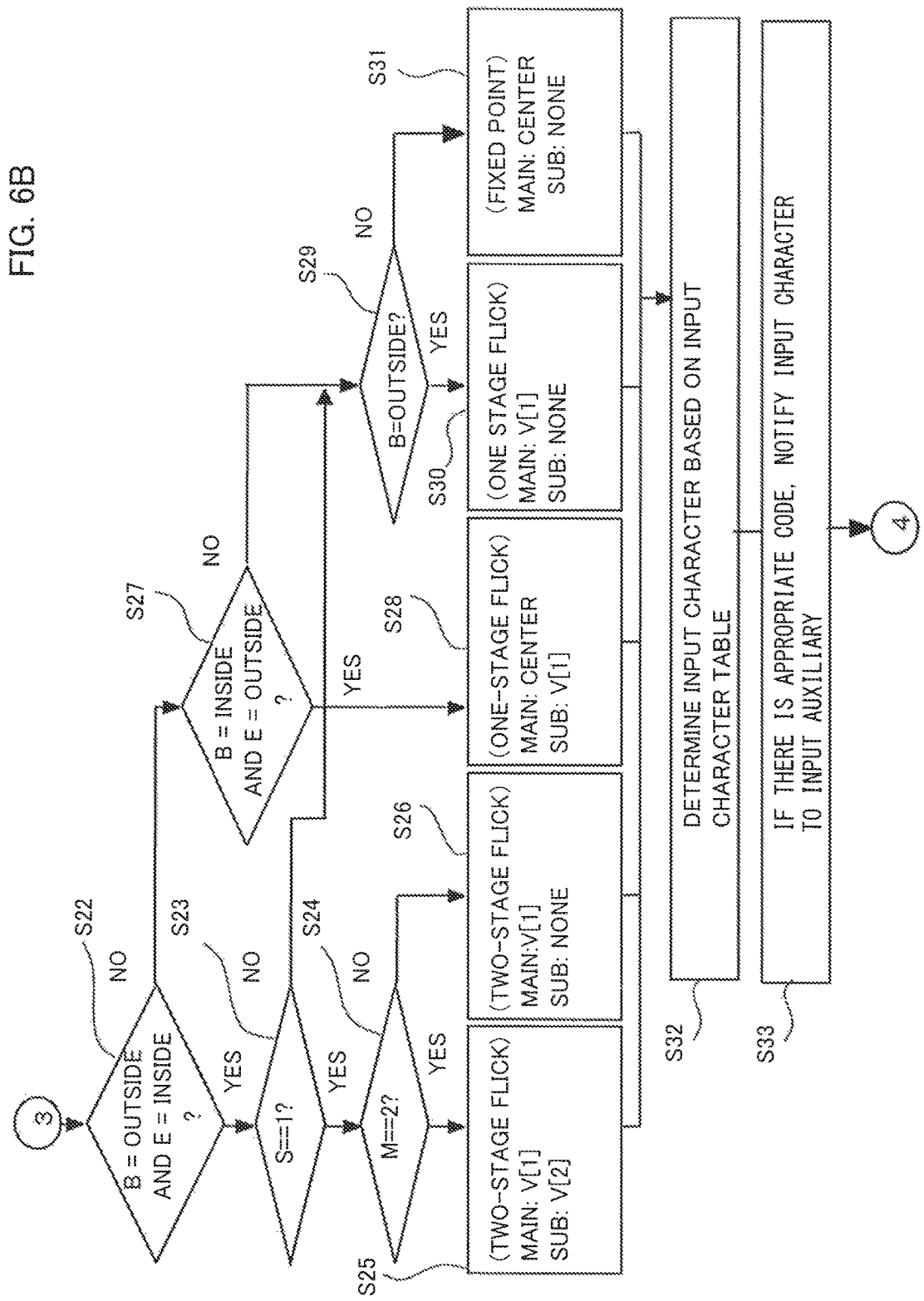
FIG. 6B is a flowchart illustrating character input processing of the present embodiment.

Hereafter, the character input processing of the information processing apparatus 10 of the present embodiment is described referring to a flowchart illustrated in FIGS. 6A, 6B and 6C. The information processing apparatus 10, for example, executes the character input processing illustrated in FIGS. 6A, 6B and 6C by means of a computer program that is expanded in an executable manner in the main storage device 12.

In the flowchart illustrated in FIGS. 6A, 6B and 6C, for example, a time at which the application 20a relating to character input processing that is installed in the information processing apparatus 10 is activated can be exemplified as the start of character input processing. The information processing apparatus 10, for example, activates the application input auxiliary 21 after activation of the application 20a, and subsequently activates the input determination 22. The input determination 22 receives input information (coordinate information and a contact state) that the touch panel detected through the touch sensor 14a, from the input control 25 (S1).

The information processing apparatus 10, for example, detects the start of a contact operation that occurs in the input region a2, based on the input information received in the processing in S1 (S2). The information processing apparatus 10, for example, passes coordinate information and contact state information acquired in the processing in S1 and the current time information to the processing in S4. Note that, in the information processing apparatus 10, for example, the start of a contact operation that occurs in the input region a2 serves as a trigger for executing the input character determination processing.

With regard to the input character determination processing executed in the processing from S3 to S33, for example, the character input mode may initially be set to "kana/kanji". From the second time onwards, the character input mode that is set when the previous input character determination processing ends may be continued.

In the processing in S4, the information processing apparatus 10 performs initial settings for determining a touch operation that occurred in the input region a2. For example, the information processing apparatus 10 sets the coordinates (starting coordinates) that are passed from the processing in S2 as opening coordinates (x, y) as a variable that records coordinates. Further, the information processing apparatus 10 sets a starting time that is passed from the processing in S2 as an opening time "t" as a variable for calculating an elapsed time period.

Further, in the processing in S4, as the initial settings, the information processing apparatus 10, for example, sets a movement direction record "V[1]" and a movement direction record "V[2]" that are variables that record a movement direction to, for example, "none". A flick direction of a first stage of a two-stage flick or a flick direction of a one-stage flick is recorded in the movement direction record "V[1]". Similarly, a flick direction of a second stage of a two-stage flick is recorded in the movement direction record "V[2]". Note that, recording of each flick direction is performed by processing in S17 and S18.

In addition, in the processing in S4, as initial settings, the information processing apparatus 10, for example, sets a value of a movement direction flag "M" and a stop flag "S" to 0. In this case, the movement direction flag "M" is a variable that indicates in which of the movement direction record "V[1]" and the movement direction record "V[2]" to record a movement direction with respect to the flick operation that is being processed, and is a variable that is used as a suffix in the manner of "V[M]". A case where M=0 indicates a state in which nothing is recorded in a movement direction record. Further, a case where M=1 indicates a state in which a movement direction of a first stage of a two-stage flick or a movement direction of a one-stage flick is recorded in the movement direction record "V[1]". Similarly, a case where M=2 indicates a state in which a movement direction of a second stage of a two-stage flick is recorded in the movement direction record "V[2]".

The stop flag "S" is a variable that records whether or not stopping of a flick of a first stage of a two-stage flick occurs after the flick is started. A state in which S=0 indicates that stopping of the flick has not occurred since the flick was started, while S=1 indicates that stopping of the flick occurred since the flick was started.

In the processing in S5, for example, the information processing apparatus 10 records starting coordinates of the touch operation in a variable "B". The information processing apparatus 10, for example, determines whether a starting position of the touch operation is in a region inside the discrimination region a3 or a region outside the discrimination region a3 based on the coordinate values of the starting coordinates recorded in the variable "B". Note that, in the processing in S5, the information processing apparatus 10 may determine whether the starting position is in a region inside or a region outside the discrimination region a3, and record the result in the variable "B". For example, a case can be exemplified in which the information processing apparatus 10 records status values of two values as flag values in the variable B, namely, B=0 when the starting position is in a region inside the discrimination region a3 and B=1 when the starting position is in a region outside the discrimination region a3.

In the processing in S6, the information processing apparatus 10, for example, waits for notification of information (coordinate information and a contact state) from the input control 25 that reads coordinate information and a contact state that are sampled at fixed periods such as 20 ms from the touch sensor 14a. The information processing apparatus 10 then determines whether the touch operation detected by the processing in S2 is continuing (S7).

In a case where, for example, information indicating that a touch operation is in progress is notified from the input control 25 ("Yes" in S7), the information processing apparatus 10 transitions to the processing in S8. On the other hand, in a case where, for example, information indicating a touch operation is not in progress is notified from the input control ("No" in S7), the information processing apparatus 10 transitions to the processing in S21. In the processing from S21 to S33, identification of an input character and switching of the character input mode and the like is performed based on the type of touch operation and the movement direction of a flick operation or the like.

In the processing in S8, the information processing apparatus 10, for example, acquires information (coordinate information) from the input control 25 that is notified by the processing in S6 and current time information. The information processing apparatus 10, for example, records the acquired coordinate information as coordinates (X, Y) that is a variable indicating the current contact position. Further, the information processing apparatus 10, for example, records the acquired time information as a time "T" that is a variable indicating the current time.

In the processing in S9, the information processing apparatus 10 determines the existence/non-existence of movement of the touch operation based on a differential value between the current coordinates (X, Y) acquired by the processing in S8 and opening coordinates (x, y) that were set in the processing in S4. The existence/non-existence of such a movement of the touch operation is determined, for example, according to whether a differential value for each coordinate component exceeds a predetermined threshold distance (THd). Here, the term "predetermined threshold distance" refers to a threshold value for distinguishing a fixed-point touch and a flick operation. With regard to the threshold distance, for example, a threshold distance for distinguishing a fixed-point touch operation and a flick operation is provisionally decided, a user is then allowed to try flick operations that are accompanied by a movement and fixed-point touch operations and the like, and the detection rates for the respective operations are measured. Thereafter, the threshold distance for distinguishing a fixed-point touch operation and a flick operation may be adjusted based on the measured detection rates for the respective operations.

In the processing in S9, the information processing apparatus 10, for example, determines that the following relation exists between the current coordinates (X, Y) acquired by the processing in S8 and the opening coordinates (x, y) set by the processing in S4. That is, the information processing apparatus 10 determines that "|X−x|>threshold distance" or that "|Y−y|>threshold distance". For example, in a case where "|X−x|>threshold distance" or "|Y−y|>threshold distance" ("Yes" in S9), the information processing apparatus 10 transitions to the processing in S10. In the processing in S10, on the basis that a movement was made, the opening time "t" is updated to the value of the current time "T".

On the other hand, in a case where, for example, the condition that "|X−x|>threshold distance" or "|Y−y|>threshold distance" is not satisfied, ("No" in S9), the information processing apparatus 10 transitions to the processing in S19. In the processing from S19 to S20, for example, stopping of the flick operation, or a touch operation that is not accompanied by a movement, such as a fixed-point touch, is determined.

In the processing in S11, the information processing apparatus 10, for example, calculates a movement direction "m" that accompanies a flick operation, based on the values of the current coordinates (X, Y) acquired by the processing in S8 and the values of the opening coordinates (x, y) set by the processing in S4. The movement direction "m", for example, is determined based on an angle calculated using an inverse trigonometric function "a tan". The information processing apparatus 10, for example, calculates a movement angle by means of the following mathematical expression (1).

$$a\tan((Y-y)/(X-x)) \qquad \text{Mathematical Expression (1)}$$

Note that, a movement angle calculated by mathematical expression (1) is, for example, determined as an angle (°) with respect to the left rotational direction by taking the normal direction of the X-axis (right direction) as "0°". The information processing apparatus 10, for example, determines the movement direction based on the angle (°) calculated by mathematical expression (1), and records the determined direction as a movement direction "m" that represents the movement direction.

When the value calculated by mathematical expression (1) is, for example, "337.5" or more and less than "22.5", "right" is determined as the movement direction. Similarly, "right-upper" is determined as the movement direction when the value is "22.5" or more and less than "67.5", "upper" is determined when the value is "67.5" or more and less than "112.5", "left-upper" is determined when the value is "112.5" or more and less than "157.5", and "left" is determined when the value is "157.5" or more and less than "202.5". Further, for example, "left-lower" is determined as the movement direction when the value is "202.5" or more and less than "247.5", "lower" is determined when the value is "247.5" or more and less than "292.5", and "right-lower" is determined when the value is "292.5" or more and less than "337.5". The determined movement direction is recorded as the movement direction "m".

In the processing in S12, the information processing apparatus 10, for example, determines that a record exists in the movement direction record. The existence of a record in the movement direction record is determined based on the value of the movement direction flag "M". For example, if the value of the movement direction flag "M" is greater than 0 ("Yes" in S12), the information processing apparatus 10 transitions to the processing in S13. In contrast, if the value of the movement direction flag "M" is 0 ("No" in S12), the information processing apparatus 10 transitions to the processing in S16.

In the processing in S13, the information processing apparatus 10, for example, determines that a movement direction record "V[M]" that records a movement direction of a flick operation that is currently being processed is in a state of recording the movement direction of a flick operation that is continuing. That is, for example, when the value recorded in the movement direction record "V[M]" is the value "none" that is initially set ("No" in S13), the information processing apparatus 10 transitions to the processing in S16. In contrast, for example, when the value recorded in the movement direction record "V[M]" is a value other than "none" that is the initial setting value ("Yes" in S13), the information processing apparatus 10 transitions to the processing in S14.

In the processing in S14, the information processing apparatus 10, for example, determines the validity of the flick operation that occurs in the input region a2, based on the movement direction "m" calculated by the processing in S11. That is, in a case where the value recorded in the movement direction record "V[M]" that records the movement direction of the flick operation that is continuing is different from the value of the movement direction "m" calculated by the processing in S11 ("Yes" in S14), the information processing apparatus 10 transitions to the processing in S15. In the processing in S15, the information processing apparatus 10 cancels the input character determination processing that started from S3, and ends the input character determination processing. For example, an erroneous operation is assumed in which the operation finger or the like that is brought into contact with the input region a2 does not stop and the movement direction changes. By performing the processing from "Yes" in S12 to S14, the information processing apparatus 10 can cancel an input by the aforementioned erroneous operation.

On the other hand, in a case where the value recorded in the movement direction record "V[M]" that records the movement direction of the flick operation that is continuing is the value of the movement direction "m" calculated by the processing in S11 ("No" in S14), the information processing apparatus 10 transitions to the processing in S16. In the processing in S16, the information processing apparatus 10, for example, determines whether the flag value that is recorded in the stop flag "S" is "1".

If the flag value that is recorded in the stop flag "S" is "1" ("Yes" in S16), for example, the information processing apparatus 10 transitions to the processing in S17. In the processing in S17, the movement direction of a second stage of a two-stage flick is recorded. The information processing apparatus 10, for example, records "2" in the movement direction flag "M", and records the movement direction "m" calculated in S11 in the movement direction record "V[M]". By means of the processing in S17, the movement direction "m" of the second stage of the two-stage flick is recorded as "V[2]=m" in the movement direction record "V[M]". After executing the processing in S17, the information processing apparatus 10 transitions to the processing in S6.

On the other hand, for example, in a case where the flag value recorded in the stop flag "S" is not "1" ("No" in S16), the information processing apparatus 10 transitions to the processing in S18. In the processing in S18, the movement direction of a one-stage flick or of the first stage of a two-stage flick is recorded. The information processing apparatus 10, for example, records "1" in the movement direction flag "M". Further, the information processing apparatus 10 records the movement direction "m" that is calculated in S11, in the movement direction record "V[M]". By the processing in S18, the movement direction "m" of a one-stage flick or of the first stage of a two-stage flick is recorded as "V[1]=m" in the movement direction record "V[M]". After executing the processing in S18, the information processing apparatus 10 transitions to the processing in S6.

In the processing in S19, stopping of the flick operation, or a touch operation that is not accompanied by a movement, such as a fixed-point touch, is specified based on an elapsed time period relating to a movement and on the respective status values recorded in the stop flag "S" and the movement direction flag "M".

The information processing apparatus 10, for example, calculates an elapsed time period relating to a movement of the touch operation based on a differential value (T−t) between the time information recorded as the current time "T" acquired by the processing in S8 and the opening time "t" that was set in the processing in S4 or updated in S10. Further, the information processing apparatus 10 adopts a fact that the calculated differential value (T−t) exceeds the predetermined threshold time (THt) as a time condition for specifying stopping of a flick operation, or a touch operation that is not accompanied by a movement, such as a fixed-point touch.

Note that, the term "predetermined threshold time" refers to a threshold for distinguishing a fixed-point touch and a flick operation. With respect to the threshold time, for example, a threshold time for distinguishing a fixed-point touch operation and a flick operation may be provisionally decided, and a user may then be allowed to try flick operations that are accompanied by a movement and fixed-point touch operations and the like, and the threshold time for distinguishing a fixed-point touch operation and a flick operation may be adjusted based on the measured detection rates or the like for the respective operations.

The information processing apparatus 10, for example, determines that the following relation exists between the above described time condition and the respective status values recorded in the stop flag "S" and the movement direction flag "M". That is, the information processing apparatus 10 determines that "(T−t)>threshold time", the flag value recorded in the stop flag "S" is "0", and the movement direction flag "M" is ">0".

In the case where, for example, "(T−t)>threshold time", the stop flag "S" is "0", and the movement direction flag "M" is ">0" ("Yes" in S19), the information processing apparatus 10 transitions to the processing in S20. In the processing in S20, for example, the information processing apparatus 10 records "1" which indicates that stopping has occurred, in the stop flag "S". Further, the information processing apparatus records the (X, Y) coordinate values acquired by the processing in S8 in the opening coordinates (x, y) that are set by the processing in S4. By means of the processing in S20, the (x, y) coordinate values that are set by the processing in S4 are updated to the (X, Y) coordinate values acquired by the processing in S8. After executing the processing in S20, the information processing apparatus 10 transitions to the processing in S6.

In contrast, in a case where the condition that, for example, "(T−t)>threshold time", the stop flag "S" is "0", and the movement direction flag "M" is ">0" is not satisfied ("No" in S19), the information processing apparatus 10 transitions to the processing in S6. It can be determined that, for example, a contact state of the touch operation that occurred in the input region a2 is continuing.

In the processing in S21, for example, the information processing apparatus 10 records the ending coordinates of the touch operation as a variable E. Based on the coordinate values of the ending coordinates recorded as the variable E, the information processing apparatus 10, for example, determines that the ending position of the touch operation is in a region inside the discrimination region a3 or in a region outside the discrimination region a3. Note that, in the processing in S21, the information processing apparatus 10 may determine whether the ending position of the touch operation is in a region inside the discrimination region a3 or a region outside the discrimination region a3, and record a value representing the result in the variable E. For example, a case can be exemplified in which the information processing apparatus 10 records the following two status values as flag values in the variable E, namely, a value "0" when the ending position is in a region inside the discrimination region a3 and a value "1" when the ending position is in a region outside the discrimination region a3.

Note that, the determination processing in S22, S27 and S29 illustrated in the flowchart in FIG. 6B is an example of processing in a case where coordinate values are recorded in the variables B and E. In a case where flag values representing a region inside or outside the discrimination region a3 are recorded in the respective variables B and E, it is sufficient to perform a comparison between the flag values recorded in the respective variables. For example, in a case where a flag value "1" is recorded in the variable B and a flag value "0" is recorded in the variable E, by performing a comparison between the respective flag values, the information processing apparatus 10 can determine that a flick operation is an operation that moves in a direction towards the inside region of the discrimination region a3 from the outside region thereof. Similarly, for example, in a case where the flag value "0" is recorded in the variable B and the flag value "1" is recorded in the variable E, the information processing apparatus 10 can determine that a flick operation is an operation that moves in a direction towards the outside region of the discrimination region a3 from the inside region thereof.

In the processing from S22 to S33, the type of touch operation, or the movement direction of a flick operation or the like is determined based on the coordinate values recorded by the processing in S5 and S21, the flag value recorded in the stop flag "S", and movement directions recorded in the movement direction flag "M", the movement direction record "V[1]" and the movement direction record "V[2]". Further, identification of an input character or switching of the character input mode or the like is performed based on the type of touch operation or the movement direction of a flick operation or the like determined by the processing from S22 to S33.

In the processing in S22, for example, based on the coordinate values recorded in the variable "B" and the variable "E", the information processing apparatus 10 determines whether starting coordinates of the touch operation are in a region outside the discrimination region a3 and the ending coordinates of the touch operation are in a region inside the discrimination region a3. For example, in a case where the starting coordinates are in a region outside the discrimination region a3 and the ending coordinates are in a region inside the discrimination region a3 ("Yes" in S22), the information processing apparatus 10 transitions to the processing in S23. On the other hand, if the condition that the starting coordinates are in a region outside the discrimination region a3 and the ending coordinates are in a region inside the discrimination region a3 is not satisfied ("No" in S22), the information processing apparatus 10 transitions to the processing in S27.

In the processing in S23, the information processing apparatus 10, for example, determines whether the flag value recorded in the stop flag "S" is "1". If the flag value recorded in the stop flag "S" is "1", for example, it can be determined that the type of touch operation that is the processing object is a two-stage flick that passed through a stopped state.

In a case where, for example, the flag value recorded in the stop flag "S" is not "1" ("No" in S23), the information processing apparatus 10 transitions to the processing in S26. In contrast, for example, if the flag value recorded in the stop flag "S" is "1" ("Yes" in S23), the information processing apparatus 10 transitions to the processing in S24. In the processing from S24 to S26, a first-stage flick operation and a second-stage flick operation that are associated with a two-stage flick as well as the movement directions of the respective flick operations are specified.

In the processing in S24, the information processing apparatus 10, for example, determines whether the flag value recorded in the movement direction flag "M" is "2". If the flag value recorded in the movement direction flag "M" is "2", for example, it can be determined that the flick operation that is the processing object is a movement of a second stage of a two-stage flick that passed through a stopped state. Further, in a case where the flag value recorded in the movement direction flag "M" is "1", for example, it can be determined that the flick operation that is the processing object finished at a first stage that is a stopped state of a two-stage flick.

In a case where, for example, the flag value recorded in the movement direction flag "M" is "2" ("Yes" in S24), the information processing apparatus 10 transitions to the processing in S25. In the processing in S25, the information processing apparatus 10, for example, acquires values indicating the movement directions recorded in the movement direction record "V[1]" and the movement direction record "V[2]". The information processing apparatus 10, for example, acquires the movement direction value recorded in the movement direction record "V[1]" as a main classification that is the first stage of a two-stage flick. Further, the information processing apparatus 10, for example, acquires the movement direction value recorded in the movement direction record "V[2]" as a sub-classification that is the second stage of a two-stage flick. The information processing apparatus 10, for example, temporarily stores each of the acquired movement direction values in a predetermined region of the main storage device 12, and passes the movement direction values to the processing in S32.

On the other hand, for example, in a case where the value recorded in the movement direction flag "M" is other than "2" ("No" in S24), the information processing apparatus 10 transitions to the processing in S26. In the processing in S26, the information processing apparatus 10, for example, acquires a movement direction value that indicates the movement direction that is recorded in the movement direction record "V[1]". The information processing apparatus 10, for example, acquires the movement direction value recorded in the movement direction record "V[1]" as a main classification that is the first stage of a two-stage flick. The information processing apparatus 10, for example, temporarily stores the acquired movement direction value of "V[1]" in a predetermined region of the main storage device 12. Further, for a sub-classification that is the second stage of the two-stage flick, in a predetermined region of the main storage device 12, the information processing apparatus 10 temporarily stores a movement direction value (for example, "center") indicating that the touch operation ended inside the central discrimination region a3. The information processing apparatus 10 passes the main classification that is the acquired movement direction value of "V[1]", and the sub-classification in which the movement direction value that indicates that the touch operation ended inside the central discrimination region a3 is recorded, to the processing in S32.

In the processing in S27, for example, based on the coordinate values recorded in the variable "B" and the variable "E", the information processing apparatus 10 determines whether starting coordinates of the touch operation are in a region inside the discrimination region a3 and the ending coordinates of the touch operation are in a region outside the discrimination region a3. For example, in a case where the starting coordinates are in a region inside the discrimination region a3 and the ending coordinates are in a region outside the discrimination region a3 ("Yes" in S27), the information processing apparatus 10 transitions to the processing in S28. On the other hand, if the condition that the starting coordinates are in a region inside the discrimination region a3 and the ending coordinates are in a region outside the discrimination region a3 is not satisfied ("No" in S27), the information processing apparatus 10 transitions to the processing in S29.

In the processing in S28, the information processing apparatus 10 acquires a movement direction value that is recorded in the movement direction record "V[1]". The information processing apparatus 10, for example, acquires the movement direction value recorded in the movement direction record "V[1]" as a sub-classification of a one-stage flick. The information processing apparatus 10, for example, temporarily stores the acquired movement direction value of "V[1]" in a predetermined region of the main storage device 12. Further, for a main classification of the one-stage flick, in a predetermined region of the main storage device 12, the information processing apparatus 10 temporarily stores a movement direction value (for example, "center") indicating that the flick operation is performed inside the central discrimination region a3. The information processing apparatus 10 passes the main classification in which the movement direction value that indicates that the flick operation is performed inside the central discrimination region a3 is recorded and the sub-classification that is the acquired movement direction value of "V[1]" to the processing in S32.

In the processing in S29, the information processing apparatus 10, for example, determines whether the starting coordinates of the touch operation are in a region outside the discrimination region a3 based on a coordinate value recorded in the variable "B". In a case where the coordinate value recorded in the variable "B" is in a region outside the discrimination region a3, it can be determined that a flick operation that is the processing object is a one-stage flick operation that started from outside the discrimination region a3. Further, in a case where the coordinate value recorded in the variable "B" is not in a region outside the discrimination region a3, it can be determined that a touch operation that is the processing object is a fixed-point touch that occurred inside the discrimination region a3.

In a case where, for example, the coordinate value recorded in the variable "B" is in a region outside the discrimination region a3 ("Yes" in S29), the information processing apparatus 10 transitions to the processing in S30. In the processing in S30, the information processing apparatus 10, for example, acquires the movement direction value that indicates a movement direction that is recorded in the movement direction record "V[1]", as the main classification of a one-stage flick. The information processing apparatus 10, for example, temporarily stores the acquired movement direction value of the main classification in a predetermined region of the main storage device 12. Further, with respect to the sub-classification of the one-stage flick, the information processing apparatus 10 temporarily stores a movement direction value (for example, "none") that indicates that the touch operation finished with a one-stage flick and there is no movement in a second-stage, in a predetermined region of the main storage device 12. The information processing apparatus 10 passes the acquired movement direction value that is the main classification, and the sub-classification in which the movement direction value is recorded that indicates that the touch operation finished after the one-stage flick and there is no second-stage movement, to the processing in S32.

On the other hand, in a case where, for example, the coordinate value recorded in the variable "B" is not in a region outside the discrimination region a3 (is inside the discrimination region a3) ("No" in S29), the information processing apparatus 10 transitions to the processing in S31. In the processing in S31, the information processing apparatus 10, for example, temporarily stores a movement direction value (for example, "center") that indicates that the touch operation is inside the discrimination region a3 in the main classification of a fixed-point touch in a predetermined region of the main storage device 12. Further, for the sub-classification of the fixed-point touch, in a predetermined region of the main storage device 12, the information processing apparatus 10 temporarily stores a movement direction value (for example, "center") indicating that, after the touch operation, the operation finger or the like withdrew from a position inside the central discrimination region a3 without an accompanying movement. The information processing apparatus 10 passes the main classification of the fixed-point touch and the status value recorded as the sub-classification to the processing in S32.

In the processing in S32, for example, the information processing apparatus 10 specifies the type of touch operation that was determined, an input character associated with a movement direction and the like, a control code and switching of the input mode or the like. Identification of the input character or the like can be performed, for example, by referring to an input character table that is illustrated in FIGS. 7A and 7B. The input character table is described later referring to FIGS. 7A and 7B.

The information processing apparatus 10 specifies the type of touch operation and an input character associated with a movement direction and the like by, for example, checking the main classification and sub-classification that are passed from the processing in S25 to S26, S28, and S30 to S31 against the input character table that is illustrated in FIGS. 7A and 7B. Note that, identification of input characters and the like is performed according to the input mode at the time that the touch operation that is the processing object is detected.

For example, in a case where the input mode is an alphanumeric characters mode, as illustrated in FIG. 3C, English characters such as "ABC", special symbols such as "./@", and numbers such as "123" are specified as input characters. On the other hand, in a case where the input mode is a kana/kanji mode, as illustrated in FIG. 3B, kana characters of the Japanese 50-sound chart, such as "a", "i", "u", are specified as input characters. According to the information processing apparatus 10, for example, by switching the input mode, input of characters associated with the alphanumeric characters mode and the kana/kanji mode, respectively, can be performed. The information processing apparatus 10, for example, temporarily stores, in a predetermined region of the main storage device 12, information such as input characters that were specified by checking against the input character table, and passes such information to the processing in S33.

In the processing in S33, the information processing apparatus 10, for example, notifies information such as a character input, a control code or switching of the input mode that is specified in the processing in S32 to the application input auxiliary 21. Note that, in a case where switching of the input mode is specified by the processing in S32, the information processing apparatus 10 changes the input mode that is the processing object. For example, if the input mode that is the processing object is the kana/kanji mode, the information processing apparatus 10 switches to the alphanumeric characters mode. Likewise, if the input mode that is the processing object is the alphanumeric characters mode, the information processing apparatus 10 switches to the kana/kanji mode. Further, the information processing apparatus 10 may be adapted so as not to execute switching upon switching of the input mode being specified by the processing in S32, and to instead notify the application input auxiliary 21 and thereafter switch the input mode upon receipt of a switching instruction from the application input auxiliary 21. After the processing in S33, the information processing apparatus 10 ends the input character determination processing with respect to the touch operation that was the processing object.

The processing in S17 to S18 that is executed by the information processing apparatus 10 is an example of a step of detecting a direction of an operation of a first stage in which a contact position on an operation surface moves from a peripheral region of the operation surface to a center region, and a step of detecting a direction of an operation of a second stage in which the contact position on the operation surface moves from the center region to the peripheral region that continues from the operation of the first stage. Further, the CPU 11 and the like of the information processing apparatus 10 executes the processing in S17 to S18 as one example of a detection unit that detects a direction of an operation of a first stage in which a contact position on an operation surface moves from a peripheral region of the operation surface to a center region, and a direction of an operation of a second stage in which the contact position on the operation surface moves from the center region to the peripheral region that continues from the operation of the first stage.

Further, the processing in S22 to S26 and S32 to S33 that is executed by the information processing apparatus 10 is an example of a step of specifying a target item from among an input item group based on a direction of an operation of a first stage, and a step of specifying an input candidate corresponding to a direction of an operation of a second stage from among the target item that is specified. Furthermore, the CPU 11 and the like of the information processing apparatus 10 executes the processing in S22 to S26 and S32 to S33 as one example of a processing unit that specifies a target item from among an input item group based on a direction of an operation of a first stage, and specifies an input candidate corresponding to a direction of an operation of a second stage from among the target item that is specified.

Further, the processing in S22, S27 to S29, and S31 to S33 that is executed by the information processing apparatus 10 is an example of, in a case where an operation of a first stage takes a center region of an operation surface as a starting position of contact, and the contact position moves from the center region to a peripheral region of the operation surface and withdraws from contact with the operation surface, a step of specifying a target item from among an input item group based on the starting position of contact of the first stage, and a step of specifying an input candidate corresponding to a direction of an operation of a first stage from among specified target items. Furthermore, the CPU 11 and the like of the information processing apparatus 10 executes the processing in S22, S27 to S29, and S31 to S33 as one example of a processing unit that, in a case where an operation of a first stage takes a center region of an operation surface as a starting position of contact, and the contact position moves from the center region to a peripheral region of the operation surface and withdraws from contact with the operation surface, specifies a target item from among an input item group based on the starting position of contact of the first stage, and specifies an input candidate corresponding to the direction of the operation of the first stage from among the target item that is specified.

Further, the processing in S27 and S29 that is executed by the information processing apparatus 10 is one example of a step of detecting contact and withdrawal with respect to a center region of an operation surface. Furthermore, the CPU 11 and the like of the information processing apparatus 10 executes the processing in S27 and S29 as one example of a detection unit that detects contact and withdrawal with respect to a center region of an operation surface.

Further, the processing in S28 and S31 to S33 that is executed by the information processing apparatus 10 is an example of, based on contact and withdrawal with respect to a center region of an operation surface, a step of specifying a target item from among an input item group, and a step of specifying an input candidate corresponding to an specified target item. Furthermore, the CPU 11 and the like of the information processing apparatus 10 executes the processing in S28 and S31 to S33 as one example of a processing unit that specifies a target item from among an input item group based on the contact and withdrawal with respect to a center region of an operation surface, and specifies an input candidate corresponding to the target item that is specified.

Further, the processing in S22, S27, S29 to S30, and S32 to S33 that is executed by the information processing apparatus 10 is an example of, in a case where an operation of a first stage takes a peripheral region of an operation surface as a starting position of contact, and the contact position moves to another position that is different from the starting position in the peripheral region and withdraws from contact with the operation surface, a step of specifying switching of a classification of an item group that is associated with a direction of the operation of the first stage, or of specifying a control code that performs conversion control with respect to an input candidate. Furthermore, the CPU 11 and the like of the information processing apparatus 10 executes the processing in S22, S27, S29 to S30, and S32 to S33 as one example of a processing unit that, in a case where an operation of a first stage takes a peripheral region of an operation surface as a starting position of contact, and the contact position moves to another position that is different from the starting position in the peripheral region and withdraws from contact with the operation surface, specifies switching of a classification of an item group that is associated with a direction of the operation of the first stage, or a control code that performs conversion control with respect to the input candidate.

[Input Character Table]

FIGS. 7A and 7B illustrates an example of an input character table for distinguishing input characters associated with a touch operation by means of movement directions that are divided into a main classification and a sub-classification. The input character table illustrated in FIGS. 7A and 7B, for example, has records in which a main classification and a sub-classification are combined. In each record, for example, a character, a control code and an input mode are the like are registered that are distinguished by a combination of the main classification and the sub-classification. Information such as a character, a control code and an input mode that is registered in each record is an example of input information that is input in association with the type of touch operation, the movement direction and the like.

Note that the input character table illustrated in FIGS. 7A and 7B are, for example, one example of a case where, as described above referring to FIG. 3A to 3F and the like, movement directions that accompany flick operations are divided into eight directions. Further, the input character table illustrated in FIGS. 7A and 7B are an example of a case of expressing movement directions by means of movement direction values that accompany flick operations. The input character table illustrated in FIGS. 7A and 7B have columns for "main classification", "sub-classification", "character/control code (input mode: kana/kanji)", and "character/control code (input mode: alphanumeric characters)", respectively.

For example, in the "main classification" column, the values "right", "right-upper", "upper", "left-upper", "left", "left-lower", "lower" and "right-lower" that indicate movement directions in a case where the angle range of "0°" to "360°" is segmented into eight equal segments, and the value "center" that indicates a position within the coordinates range of the discrimination region a3 are stored. As described above referring to FIG. 3A to 3F and the like, since there is no movement direction in the case of a touch operation such as a fixed-point touch within the coordinates range of the discrimination region a3, the identification value "center" is used.

In the "sub-classification" column, similarly to the "main classification" column, values of movement directions in a case where the angle range of "0°" to "360°" is segmented into eight equal segments, and the value "center" that indicates a position within the coordinates range of the discrimination region a3 are stored. In addition, a value "none" that indicates that a stopped state did not occur is also stored. A one-stage flick that is started from outside the discrimination region a3 and ends outside the discrimination region without stopping, and a two-stage flick that is started from outside the discrimination region a3 and ends inside the discrimination region a3 are differentiated by means of "none" and "center". That is, "none" corresponds to a one-stage flick that is started from outside the discrimination region a3 and ends outside the discrimination region without stopping, and "center" corresponds to a two-stage flick that ends inside the discrimination region a3.

As described above referring to FIGS. 3A to 3F and the like, after identification of input items as objects for input, when specifying an input candidate from among the specified items a case can be assumed in which the quantity of input candidates is less than the quantity of an input item group. For example, in a case where the input item "ma" is selected from among the nine items "a, ka, sa, ta, na, ha, ma, ya, ra", the input candidates are the five items "ma, mi, mu, me, mo". In a case where "ma" is associated with the discrimination region a3 that is the center of the input region a2, it is possible to specify the respective input candidates "mi, mu, me, mo" if at least four movement directions exist.

For example, in order to specify the respective input candidates "mi, mu, me, mo", it is sufficient if at least the four movement directions "right", "lower", "left" and "upper" can be distinguished among the eight movement directions. That is, a configuration may also be adopted that distinguishes the four movement directions "right", "lower", "left" and "upper" based on angle ranges in a case where the angle range of "0°" to "360°" is segmented into four equal segments.

For example, let us assume that a first-stage flick of a two-stage flick stops, and the information processing apparatus 10 is in the course of processing a second-stage flick. In this case, for example, a configuration may be adopted in which, when determining the movement direction "m" in S11, the information processing apparatus 10 expands the angle ranges for specifying a movement direction with respect to an angle of a second-stage from angle ranges that are divided into eight segments to angle ranges that are divided into four segments, and specifies the movement direction. The information processing apparatus 10 can dynamically expand the angle range according to the quantity of input candidates. The information processing apparatus 10, for example, can improve the distinguishability of input information with respect to touch operations for which the input region a2 and the discrimination region a3 are set.

In the input character table illustrated in FIGS. 7A and 7B, for example, input information such as kana characters, control codes, and input mode switching to the alphanumeric characters mode is stored in the "character/control code (input mode: kana/kanji)" column. The control codes include, for example, voiced sound symbol character conversion, upper/lower-case character conversion, input character deletion control and semi-voiced sound symbol character conversion.

Note that the input information stored in the "character/control code (input mode: kana/kanji)" column is information that is used when the input mode is the kana/kanji mode. The input information of the "character/control code (input mode: kana/kanji)" column is specified by a combination of various kinds of information stored in the "main classification" column and "sub-classification" column of the same record.

In the "character/control code (input mode: alphanumeric characters)" column, for example, input information such as alphanumeric characters, control codes, and input mode switching to the kana/kanji mode is stored. The control codes include, for example, upper/lower-case character conversion and input character deletion control. In this case, the input information stored in the "character/control code (input mode: alphanumeric characters)" column is information that is used when the input mode is the alphanumeric characters mode. The input information of the "character/control code (input mode: alphanumeric characters)" column is specified by a combination of various kinds of information stored in the "main classification (arc angle)" column and "sub-classification (arc angle)" column of the same record.

In the input character table illustrated in FIGS. 7A and 7B, for example, "a, i, u, e, o" are stored in the "character/control code (input mode: kana/kanji)" column of records for which "right-lower" is stored in the "main classification" column. It is thus known that, when the input mode is the kana/kanji mode, input items of the row "a" are specified by performing a flick operation in the "right-lower" direction towards the inside region of the discrimination region a3 from the region outside the discrimination region a3 in a first stage of a two-stage flick.

Further, for example, "right" is stored in the "sub-classification (arc angle)" column of the record for which "e" is stored in the "character/control code (input mode: kana/kanji)" column. It is thus known that, after specifying input items of the row "a" in the first stage of a two-stage flick, the input candidate "e" is specified by performing a flick operation in the "right" direction in the second stage from the inside region of the discrimination region a3 towards the region outside the discrimination region a3.

Furthermore, for example, "./@:1" are stored in the "character/control code (input mode: alphanumeric characters)" column of records for which "right-lower" is stored in the "main classification" column. It is thus known that, when the input mode is the alphanumeric characters mode, the input items "./@:1" are specified by performing a flick operation in the "right-lower" direction towards the inside region of the discrimination region a3 from the region outside the discrimination region a3 in a first stage of a two-stage flick.

Further, for example, "upper" is stored in the "sub-classification (arc angle)" column of the record for which "@" is stored in the "character/control code (input mode: alphanumeric characters)" column. It is thus known that, after specifying the input items "./@:1" in the first stage of a two-stage flick, the input candidate "@" is specified by performing a flick operation in the "upper" direction in the second stage from the region inside the discrimination region a3 to the region outside the discrimination region a3.

Further, in the input character table illustrated in FIGS. 7A and 7B, for example, "na, ni, nu, ne, no" are stored in the "character/control code (input mode: kana/kanji)" column of records for which "center" is stored in the "main classification" column. It is thus known that, when the input mode is the kana/kanji mode, input items of the row "na" are specified by performing a one-stage flick that takes the discrimination region a3 as a starting position.

For example, "center" is stored in the "sub-classification" column of the record for which "na" is stored in the "character/control code (input mode: kana/kanji)" column. It is thus known that the input candidate "na" is specified by performing a fixed-point touch in which, after specifying input items of the row "na" by contact of an operation finger in a manner that takes the discrimination region a3 as a starting position, the contacting operation finger is withdrawn from contact with the discrimination region a3 without being moved. Further, for example, "left" is stored in the "sub-classification" column of the record for which "ni" is stored in the "character/control code (input mode: kana/kanji)" column. It is thus known that the input candidate "ni" is specified by, after specifying input items of the row "na" by contact of an operation finger in a manner that takes the discrimination region a3 as a starting position, performing a one-stage flick operation in the "left" direction towards the region outside the discrimination region a3 from the region inside the discrimination region a3.

For example, "J, K, L, &, 5" are stored in the "character/control code (input mode: alphanumeric characters)" column of records for which "center" is stored in the "main classification" column. It is thus known that, when the input mode is the alphanumeric characters mode, input items "J, K, L, &, 5" are specified by performing a one-stage flick that takes the discrimination region a3 as a starting position.

For example, "center" is stored in the "sub-classification" column of the record for which "J" is stored in the "character/control code (input mode: alphanumeric characters)" column. It is thus known that the input candidate "J" is specified by performing a fixed-point touch in which, after specifying the input items "J, K, L, &, 5" by contact of an operation finger in a manner that takes the discrimination region a3 as a starting position, the contacting operation finger is withdrawn from contact with the discrimination region a3 without being moved. Further, for example, "upper" is stored in the "sub-classification" column of the record for which "L" is stored in the "character/control code (input mode: alphanumeric characters)" column. It is thus known that the input candidate "L" is specified by, after specifying the input items "J, K, L, &, 5" by contact of an operation finger in a manner that takes the discrimination region a3 as a starting position, performing a one-stage flick operation in the "upper" direction towards the region outside the discrimination region a3 from the region inside the discrimination region a3.

Further, in the input character table illustrated in FIGS. 7A and 7B, for example, "right" is stored in the "main classification" column of a record for which "input mode switching (to alphanumeric characters)" is stored in the "character/control code (input mode: kana/kanji)" column. Further, "none" is stored in the "sub-classification (arc angle)" column of the same record. It is thus known that, when the input mode is the kana/kanji mode, input mode switching to the alphanumeric characters mode is specified by performing a one-stage flick in the "right" direction in a manner that takes the region outside the discrimination region a3 as a starting position.

Similarly, for example, "right" is stored in the "main classification" column of the record for which "input mode switching (to kana/kanji)" is stored in the "character/control code (input mode: alphanumeric characters)" column. It is thus known that, when the input mode is the alphanumeric characters mode, input mode switching to the kana/kanji mode is specified by performing a one-stage flick in the "right" direction in a manner that takes the region outside the discrimination region a3 as a starting position and ends outside the discrimination region a3.

As described above, in the information processing apparatus 10 of the present embodiment, for example, the discrimination region a3 for distinguishing types of touch operations and movement directions can be provided inside the input region a2 of the touch panel region a1. By means of the coordinates range of the discrimination region a3, the information processing apparatus 10 of the present embodiment can distinguish a flick operation from a peripheral region outside the discrimination region a3 to inside the discrimination region a3, and a flick operation from inside the discrimination region a3 to a peripheral region outside the discrimination region a3. Further, the information processing apparatus 10 can distinguish a tap operation (fixed-point touch) inside the discrimination region a3.

In a case where the type of touch operation that is distinguished using the discrimination region a3 is a flick operation, the information processing apparatus 10 can specify movement directions that accompany a first-stage flick operation and a second-stage flick operation of a two-stage flick by means of a path that joins the starting position and ending position of the flick operation. Similarly, the information processing apparatus 10 can specify a movement direction that accompanies a flick operation of a one-stage flick by means of a path that joins the starting position and ending position of the flick operation.

The information processing apparatus 10 of the present embodiment, for example, can distinguish input items of information associated with a touch operation that is determined by means of the coordinates range of the discrimination region a3, based on a combination pattern that combines the type of the touch operation and a movement direction.

For example, the information processing apparatus 10 can distinguish at least 64 kinds of input items by means of movements in eight directions that accompany a two-stage flick. In addition, the information processing apparatus 10 can distinguish at least eight kinds of input items by means of movements in eight directions with respect to a one-stage flick that take the discrimination region a3 as a starting position. Further, the information processing apparatus 10 can distinguish an input item associated with the discrimination region a3 by means of a fixed-point touch inside the discrimination region a3. Furthermore, the information processing apparatus 10 can distinguish at least eight kinds of input items by means of movements in eight directions with respect to a one-stage flick that takes a region outside the discrimination region a3 as a starting position and ends outside the discrimination region a3.

As a result, according to the information processing apparatus 10 of the present embodiment, for example, it is possible to specify an item group including a character candidate that is an input target from among item groups such as the "a" columns of the respective rows of "a, ka, sa, ta, na, ha, ma, ya, ra, wa" or the like. Further, according to the information processing apparatus 10 of the present embodiment, an input item (character candidate) that is the target can be specified from among the specified item group. In addition, the information processing apparatus 10, for example, can specify a voiced sound symbol modifier, a semi-voiced sound symbol modifier, an upper/lower-case character modifier or control processing such as character deletion with respect to an specified input item (character candidate). Furthermore, the information processing apparatus 10, for example, can switch the input mode from kana/kanji to alphanumeric characters, and from alphanumeric characters to kana/kanji.

According to the information processing apparatus 10 of the present embodiment, an input interface for information which is associated with a combination pattern that is a combination of a type of a touch operation that is distinguished using the discrimination region a3 and a movement direction can be provided.

According to the information processing apparatus 10 of the present embodiment, the discrimination region a3 can be provided, for example, in the region of a center portion that includes the center position of the input region a2. Therefore, for example, even in a case where the input region of the touch panel is narrow, an effect can be expected such that estimation of the center position of the input region a2 is facilitated by visually confirming the area of the input region a2. As a result of the center position being estimated, for example, an effect that facilitates the performance of a flick operation from a peripheral region of the input region a2 towards a center position thereof, or from the center position of the input region a2 to a peripheral region thereof can be expected. Further, with regard to a user that performs a touch operation, an effect can be expected such that performance of a tap operation on the center position of the input region a2 is facilitated.

Further, the information processing apparatus 10 of the present embodiment can detect respective directions obtained by segmenting an angle range of 360 degrees into equal segments by adopting the vertical axis or horizontal axis of the touch panel region a1 as a reference axis. Because the information processing apparatus 10 can specify movement directions within angle ranges obtained by segmenting an angle of 360 degrees into equal segments with respect to a reference axis, it is possible to distinguish an input item that is associated with a movement direction. According to the information processing apparatus 10 of the present embodiment, even in a case where the input region of the touch panel is narrow, an effect of suppressing pressing errors such as erroneous contact onto a neighboring operation object or the like can be expected. According to the information processing apparatus 10 of the present embodiment, an input interface in which usability is enhanced may be provided.

<<Computer Readable Recording Medium>>

A program for causing a computer, another machine or an apparatus (hereinafter, referred to as "computer or the like") to realize any of the functions described above can be recorded on a recording medium that is readable by the computer or the like. The relevant function can be provided by causing the computer or the like to read and execute the program on the recording medium.

Herein, the term "recording medium that is readable by the computer or the like" refers to a recording medium that is capable of accumulating information such as data and programs electrically, magnetically, optically, mechanically or by chemical action, and that can be read from a computer or the like. Among such recording mediums, for example, a flexible disk, a magneto-optical disk, a CD-ROM, a CD-R/W, a DVD, a Blu-ray disc, a DAT, an 8 mm tape and a memory card such as a flash memory may be mentioned as recording mediums that are removable from the computer or the like. Further, a hard disc and a ROM may be mentioned as recording mediums that are fixed in the computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
    a memory; and
    a processor coupled to the memory and configured to:
        detect a direction of an operation of a first stage in which a contact position on an operation surface moves from a peripheral region of the operation surface to a center region thereof, and a direction of an operation of a second stage in which the contact position moves from the center region to the peripheral region, wherein the operation of the second stage continues from the operation of the first stage;

display an input item group on the peripheral region of the operation surface when the operation of the first stage is performed;

specify a target item from among an input item group based on the direction of the operation of the first stage, wherein the target item includes a plurality of input candidates;

display the plurality of input candidates corresponding to the target item on the peripheral region of the operation surface instead of the input item group; and specify an input candidate corresponding to the direction of the operation of the second stage from among the plurality of input candidates included in the specified target item.

2. The information processing apparatus according to claim 1, wherein in a case where an operation of a first stage takes a center region of the operation surface as a starting position of contact, and the contact position moves from the center region to a peripheral region of the operation surface and withdraws from contact with the operation surface, the processor is configured to specify a target item from among an input item group based on the starting position of the contact of the first stage, and to specify an input candidate corresponding to the direction of the operation of the first stage from among the specified target item.

3. The information processing apparatus according to claim 1, wherein:
the processor is configured to:
detect contact and withdrawal with respect to the center region of the operation surface;
specify a target item from among an input item group based on the contact and withdrawal with respect to the center region of the operation surface; and
specify an input candidate corresponding to the specified target item.

4. The information processing apparatus according to claim 1, wherein in a case where an operation of a first stage takes a peripheral region of the operation surface as a starting position of contact, and the contact position moves to another position that is different from the starting position in the peripheral region and withdraws from contact with the operation surface, the processor is configured to specify switching of a classification of the item group that is associated with a direction of the operation of the first stage, or a control code that performs conversion control with respect to the input candidate.

5. The information processing apparatus according to claim 1, wherein, based on an angle at which a path that links a contact position that is acquired earlier and a contact position that is acquired later among time series data for the contact position, and a vertical axis or a horizontal axis of the operation surface intersect, the processor is configured to detect directions obtained by segmenting an angle range of 360 degrees into equal segments that adopt the vertical axis or the horizontal axis of the operation surface as a reference axis.

6. A non-transitory computer readable recording medium having recorded therein an input control program for causing a computer to execute a process comprising:
detecting a direction of an operation of a first stage in which a contact position on an operation surface moves from a peripheral region of the operation surface to a center region thereof;

detecting a direction of an operation of a second stage in which the contact position moves from the center region to the peripheral region, wherein the operation of the second stage continues from the operation of the first stage;

displaying an input item group on the peripheral region of the operation surface when the operation of the first stage is performed;

specifying a target item from among an input item group based on the direction of the operation of the first stage, wherein the target item includes a plurality of input candidates;

displaying the plurality of input candidates corresponding to the target item on the peripheral region of the operation surface instead of the input item group; and specifying an input candidate corresponding to the direction of the operation of the second stage from among the plurality of input candidates included in the specified target item.

7. The non-transitory computer recording medium according to claim 6, wherein the process further comprises:
in a case where a center region of the operation surface is set as a starting position of contact by an operation of a first stage, and the contact position moves from the center region to a peripheral region of the operation surface and withdraws from contact with the operation surface, specifying a target item from among an input item group based on the starting position of the contact of the first stage; and
specifying an input candidate corresponding to the direction of the operation of the first stage from among the specified target item.

8. The non-transitory computer recording medium according to claim 6, wherein the process further comprises:
detecting contact and withdrawal with respect to the center region of the operation surface;
specifying a target item from among an input item group based on the contact and withdrawal with respect to the center region of the operation surface; and
specifying an input candidate corresponding to the specified target item.

9. The non-transitory computer recording medium according to claim 6, wherein the process further comprises, in a case where a peripheral region of the operation surface is set as a starting position of contact by an operation of a first stage, and the contact position moves to another position that is different from the starting position in the peripheral region and withdraws from contact with the operation surface, specifying switching of a classification of the item group that is associated with a direction of the operation of the first stage, or a control code that performs conversion control with respect to the input candidate.

10. The non-transitory computer recording medium according to claim 6, wherein the process further comprises, based on an angle at which a path that links a contact position that is acquired earlier and a contact position that is acquired later among time series data for the contact position, and a vertical axis or a horizontal axis of the operation surface intersect, detecting directions obtained by segmenting an angle range of 360 degrees into equal segments that adopt the vertical axis or the horizontal axis of the operation surface as a reference axis.

11. An input control method, comprising:
detecting, using a processor, a direction of an operation of a first stage in which a contact position on an operation surface moves from a peripheral region of the operation surface to a center region thereof;

detecting, using the processor, a direction of an operation of a second stage in which the contact position moves from the center region to the peripheral region, wherein the operation of the second stage continues from the operation of the first stage;

displaying, using the processor, an input item group on the peripheral region of the operation surface when the operation of the first stage is performed;

specifying, using the processor, a target item from among an input item group based on the direction of the first operation of the first stage, wherein the target item includes a plurality of input candidates;

displaying the plurality of input candidates corresponding to the target item on the peripheral region of the operation surface instead of the input item group; and specifying, using the processor, an input candidate corresponding to the direction of the operation of the second stage from among the plurality of input candidates included in the specified target item.

12. The input control method according to claim 11, further comprising:

in a case where a center region of the operation surface is set as a starting position of contact by an operation of a first stage, and the contact position moves from the center region to a peripheral region of the operation surface and withdraws from contact with the operation surface, specifying, using the processor, a target item from among an information item group that is displayed on the operation surface, based on the starting position of the contact of the first stage; and specifying, using the processor, an input candidate corresponding to the direction of the operation of the first stage from among the specified target item.

13. The input control method according to claim 11, further comprising:

detecting, using the processor, contact and withdrawal with respect to the center region of the operation surface; and specifying, using the processor, a target item from among an information item group that is displayed on the operation surface, based on the contact and withdrawal with respect to the center region of the operation surface.

14. The input control method according to claim 11, further comprising, in a case where a peripheral region of the operation surface is set as a starting position of contact by an operation of a first stage, and the contact position moves to another position that is different from the starting position in the peripheral region and withdraws from contact with the operation surface, specifying, using the processor, switching of a classification of the item group that is associated with a direction of the operation of the first stage, or a control code that performs conversion control with respect to the input candidate.

15. The input control method according to claim 11, further comprising, based on an angle at which a path that links a contact position that is acquired earlier and a contact position that is acquired later among time series data for the contact position, and a vertical axis or a horizontal axis of the operation surface intersect, detecting, using the processor, directions obtained by segmenting an angle range of 360 degrees into equal segments that adopt the vertical axis or the horizontal axis of the operation surface as a reference axis.

* * * * *